(12) United States Patent
Mello et al.

(10) Patent No.: US 7,538,891 B1
(45) Date of Patent: May 26, 2009

(54) SURFACE CHARACTERIZATION BASED ON LATERAL SHEARING OF DIFFRACTED WAVE FRONTS TO MEASURE IN-PLANE AND OUT-OF-PLANE DISPLACEMENT GRADIENT FIELDS

(75) Inventors: Michael Mello, Phoenix, AZ (US); Ares J. Rosakis, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 172 days.

(21) Appl. No.: 11/538,055

(22) Filed: Oct. 2, 2006

Related U.S. Application Data

(60) Provisional application No. 60/722,514, filed on Sep. 30, 2005.

(51) Int. Cl.
*G01B 9/02* (2006.01)
*G01L 1/24* (2006.01)

(52) U.S. Cl. .................. 356/520; 356/35.5; 356/521

(58) Field of Classification Search ............. 356/35.5, 356/450, 520, 521
See application file for complete search history.

(56) References Cited

U.S. PATENT DOCUMENTS 5,710,631 A * 1/1998 Bou-Ghannam et al. .... 356/495
6,031,611 A * 2/2000 Rosakis et al. ............. 356/511
6,304,325 B1 * 10/2001 Hardy et al. ................ 356/450
6,600,565 B1 * 7/2003 Suresh et al. .............. 356/521
2004/0257587 A1 12/2004 Rosakis et al.

OTHER PUBLICATIONS

Bates, W.J., "A Wavefront Shearing Interferometer," *Proceedings of the Physical Society of London*, 59(6):940-950, Nov. 1947.
Boone, P.M., "Determination of Slope and Strain Contours by Double-exposure Shearing Interferometry," *Experimental Mechanics*, 15(8):295-302, Aug. 1975.
Kim, K.-S., et al., "A combined normal- and transverse-displacement interferometer with an application to impact of $y$-cut quartz," *Journal of Applied Physics*, 48(10):4132-4139, Oct. 1977.
Lee, H., et al., "Full-field optical measurement of curvatures in ultra-thin-film-substrate systems in the range of geometrically nonlinear deformations," *Journal of Applied Physics*, 89(11):6116-6129, Jun. 2001.
Nakadate, S., et al., "Fringe scanning speckle-pattern interferometry," *Applied Optics*, 24(14):2172-2180, Jul. 1985.
Patorski, K., "Shearing interferometry and the moire method for shear strain determination," *Applied Optics*, 27(16):3567-3572, Aug. 1988.
Patorski, K., et al., "Real-time optical differentiation for Moiré interferometry," *Applied Optics*, 26(10):1977-1982, May 1987.

(Continued)

*Primary Examiner*—Michael A Lyons
(74) *Attorney, Agent, or Firm*—Fish & Richardson P.C.

(57) ABSTRACT

Apparatus and techniques for using an optical shearing interferometry to obtain full field mapping of in-plane and out-of-plane displacement field gradients of a sample surface of a sample.

37 Claims, 16 Drawing Sheets

OTHER PUBLICATIONS

Rastogi, P.K., "High Resolution Moiré Photography: Extension to Variable Sensitivity Displacement Measurement and to the Determination of Direct Strains," *Supplement to Optics & Photonics News*, 9(2):8133-8135, Feb. 1998.

Rastogi, P.K., "Letter Measurement of in-plane strains using electronic speckle and electronic speckle-shearing pattern interferometry," *Journal of Modern Optics*, 43(8):1577-1581, Aug. 1996.

Tippur, H.V., et al., "A coherent gradient sensor for crack tip deformation measurements: analysis and experimental results," *International Journal of Fracture*, 48(3):193-204, Apr. 1991.

Tippur, H.V., et al., "Optical mapping of crack tip deformations using the methods of transmission and reflection coherent gradient sensing: a study of crack tip $K$-dominance," *International Journal of Fracture*, 52(2):91-117, Nov. 1991.

Weissman, E.M., et al., "Whole-Field Strain Determination by Moiré Shearing Interferometry," *Journal of Strain Analysis for Engineering Design*, 19(2):77-80, 1984.

Assa, A., et al., "Recording slope and curvature contours of flexed plates using a grating shearing interferometer," *Applied Optics*, 16(9):2504-2513, Sep. 1977.

Creath, K., "Phase-measurement interferometry techniques," *Progress in Optics*, 26:349-393, (1988).

Espinosa, H.D., et al., "A Variable Sensitivity Displacement Interferometer with Application to Wave Propagation Experiments," *Journal of Applied Mechanics*, 64(1):123-131, Mar. 1997.

Han, B., et al., "Immersion Interferometer for Microscopic Moiré Interferometry," *Experimental Mechanics*, 32(1):38-41, Mar. 1992.

He, M.Y., et al., "Asymmetric Four-Point Crack Specimen," *Journal of Applied Mechanics*, 67(1):207-209, Mar. 2000.

Hung, Y.Y., et al., "Speckle-Shearing Interferometric Technique: a Full-Shield Strain Gauge," *Applied Optics*, 14(3):618-622, Mar. 1975.

Mello, M., et al., "Infrared Diffraction Interferometer for Coplanarity Measurement of High-Density Solder Bump Pattern," *Optical Engineering*, 43(4):888-894, Apr. 2004.

Park, T.-S., et al., "Measurement of full-field curvature and geometrical instability of thin film-substrate systems through CGS interferometry," *Journal of the Mechanics and Physics of Solids*, 51(11-12):2191-2211, Nov.-Dec. 2003.

Patorski, K., et al., "Collimation test by double grating shearing interferometer," *Applied Optics*, 15(5):1234-1240, May 1976.

Patorski, K., et al., "Digital in-plane electronic speckle pattern shearing interferometry," *Optical Engineering*, 36(7):2010-2015, Jul. 1997.

Rosakis, A.J., et al., "Full field measurements of curvature using coherent gradient sensing: application to thin film characterization," *Thin Solid Films*, 325(1-2):42-54, Jul. 1998.

Shang, H.M., et al., "Locating and Sizing Disbonds in Glassfibre-Reinforced Plastic Plates Using Shearography," *Journal of Engineering Materials and Technology*, 113(1):99-103, Jan. 1991.

Shield, T.W., et al., "Diffraction Theory of Optical Interference Moiré and a Device for Production of Variable Virtual Reference Gratings: a Moiré Microscope," *Experimental Mechanics*, 31(2):126-134, Jun. 1991.

\* cited by examiner

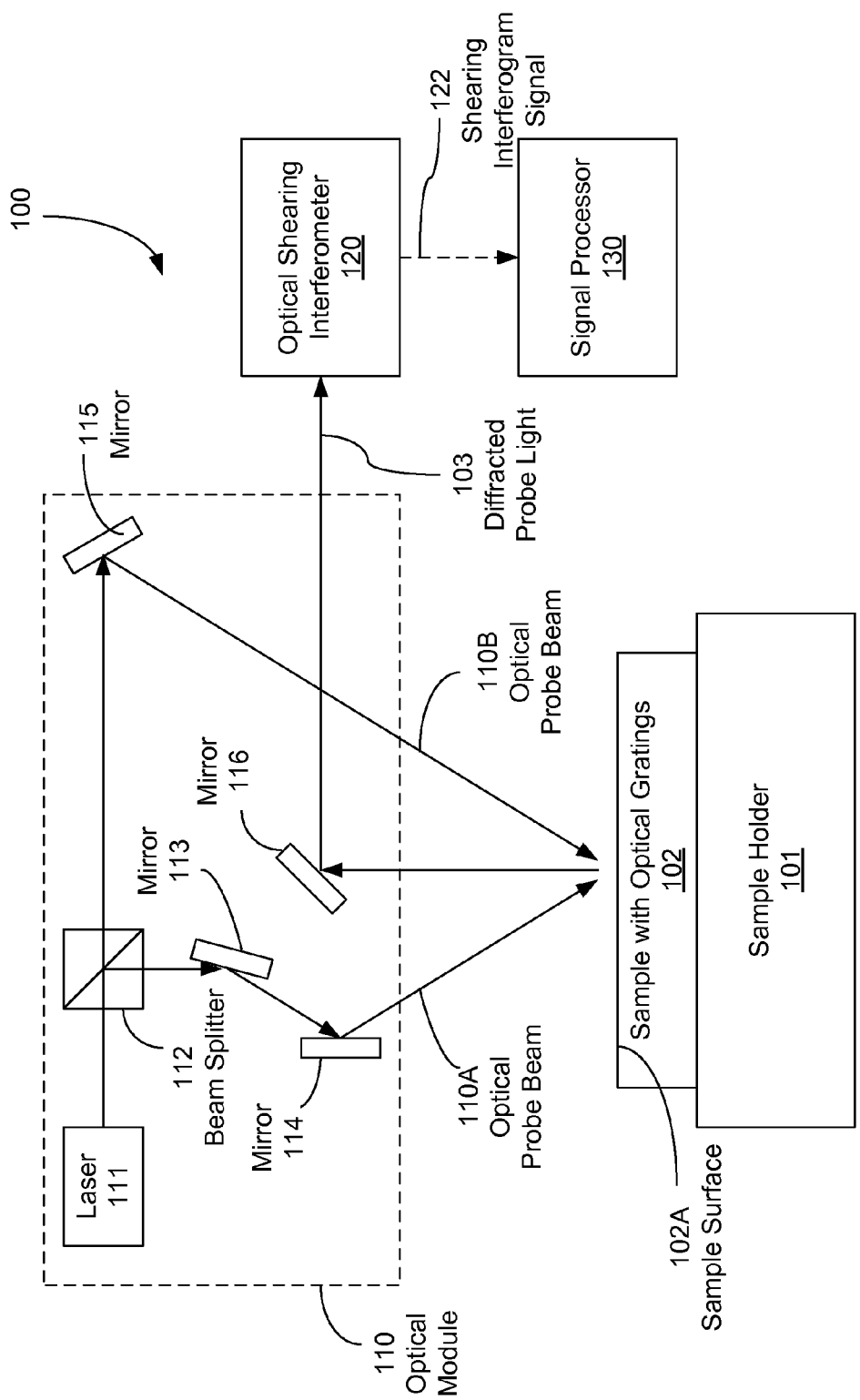

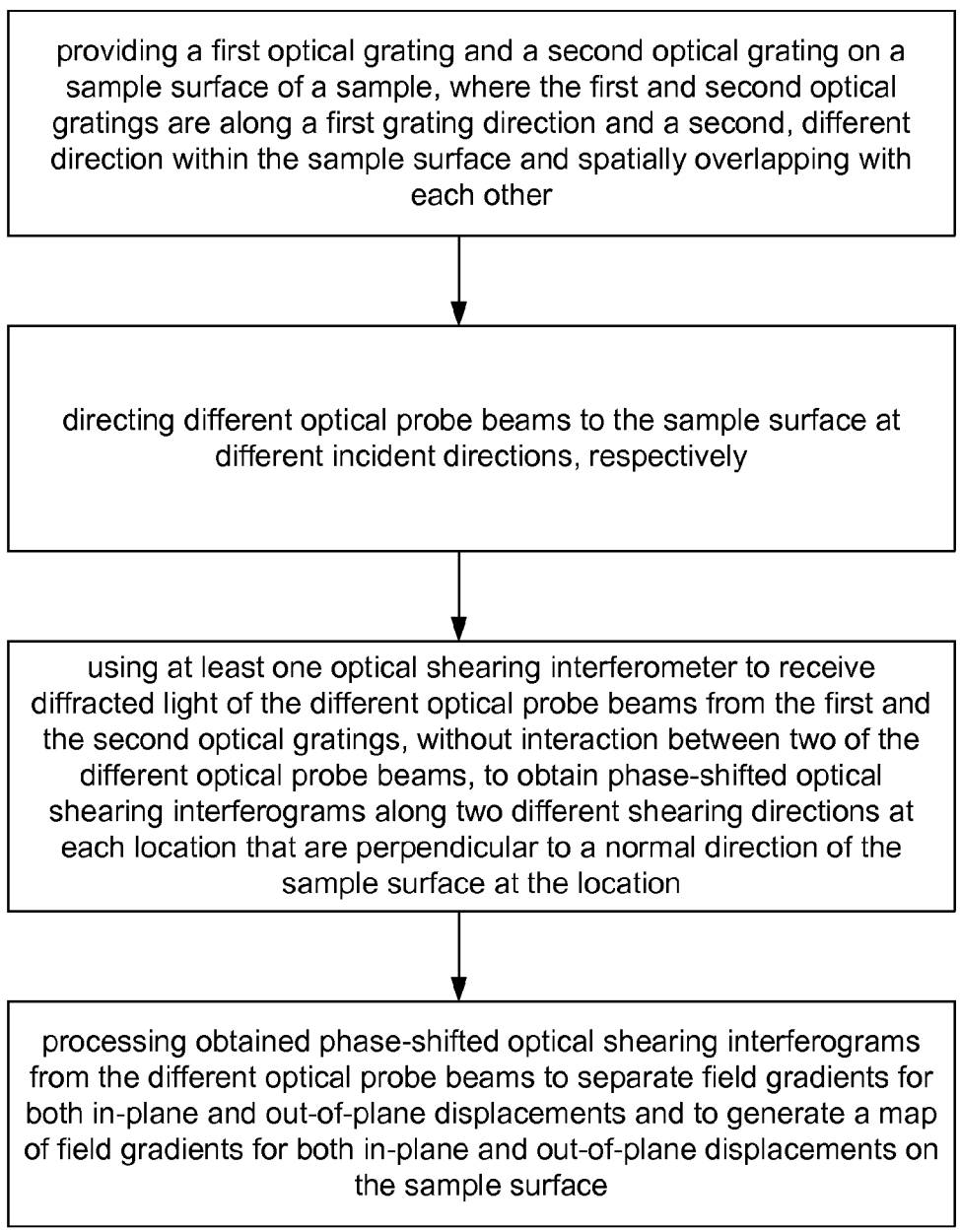

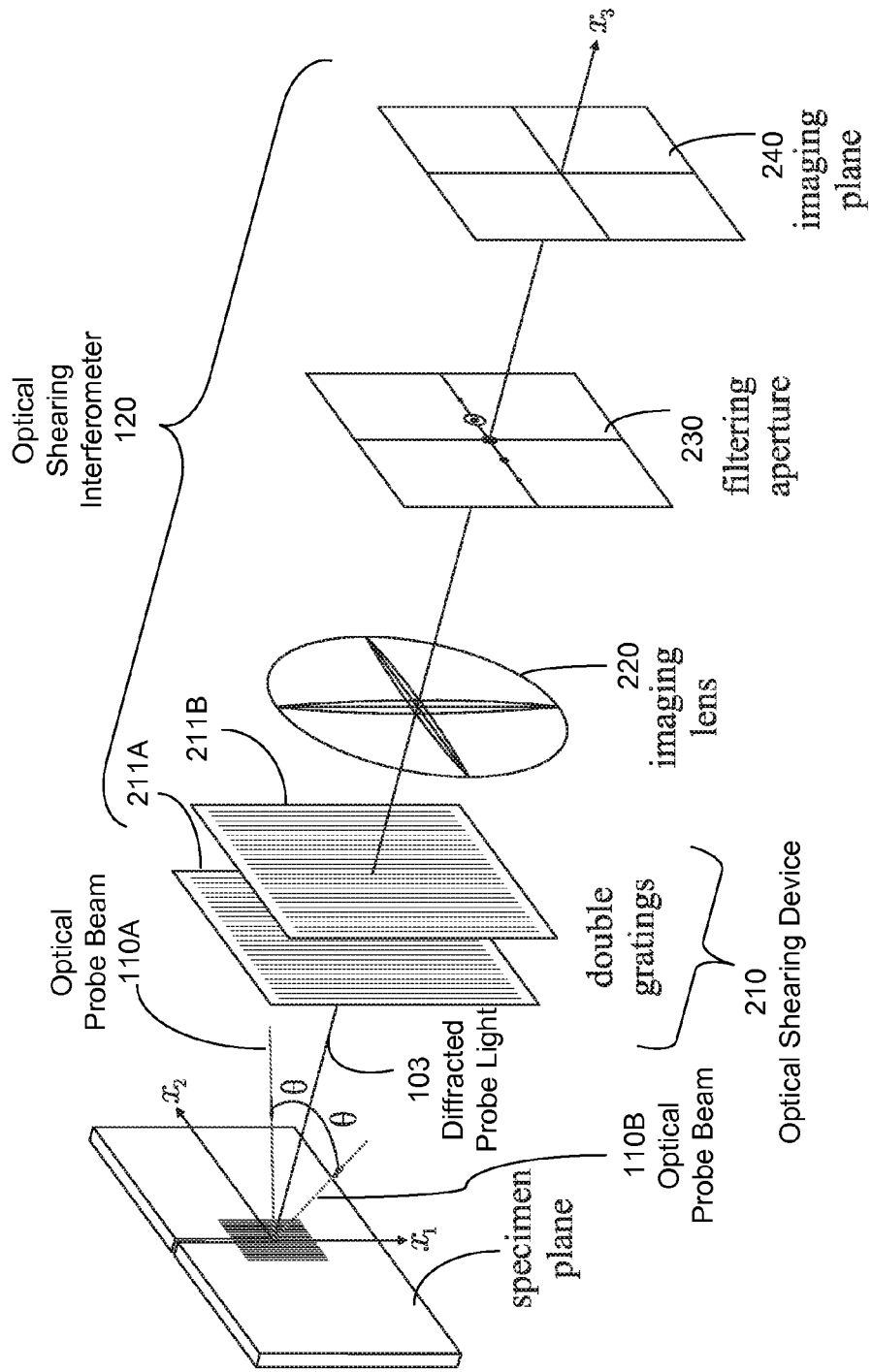

FIG. 4
FIG. 4A
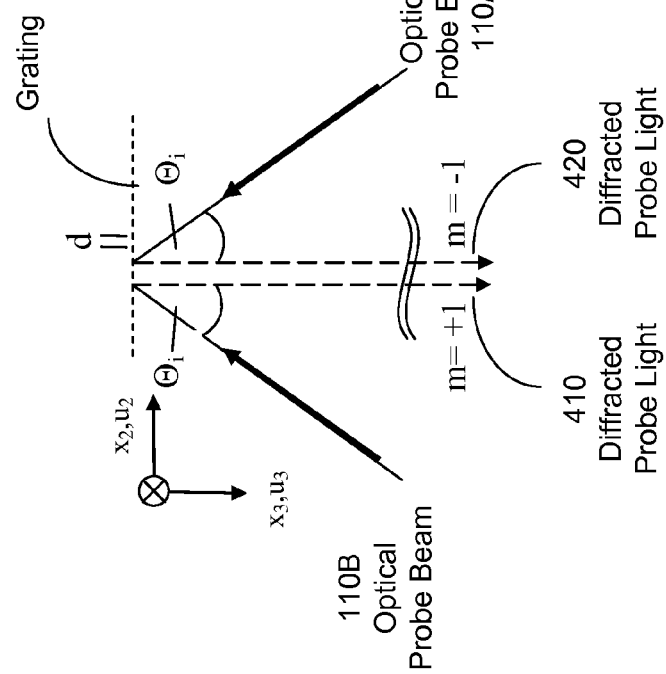
FIG. 4B
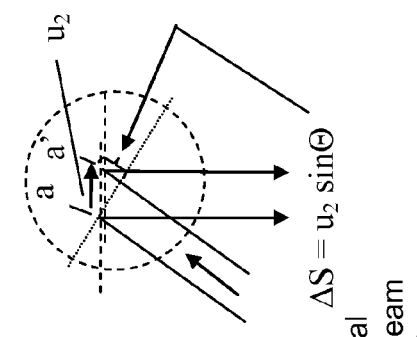
FIG. 4C
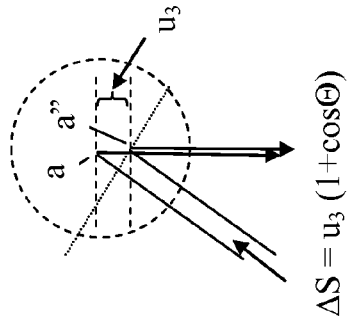

SURFACE CHARACTERIZATION BASED ON LATERAL SHEARING OF DIFFRACTED WAVE FRONTS TO MEASURE IN-PLANE AND OUT-OF-PLANE DISPLACEMENT GRADIENT FIELDS

This application claims the benefit of U.S. Provisional Application No. 60/722,514 entitled "combined normal & transverse gradient interferometer" and filed on Sep. 30, 2005, which is incorporated by reference as part of the specification of this application.

BACKGROUND

This application relates to measurements of surface slopes and other topological properties of surfaces in flat panels, substrates, and wafers, and more particularly, to optical techniques and systems for such measurements.

Optical interferometry uses optical interference between two at least partially mutually coherent beams to extract information embedded in the wavefront of at least one of the beams as an optical probe beam which interacts with a target whose information is under measurement. Various coherent optical measurement techniques have been proposed for measuring deformation fields on loaded and deforming solids with increased sensitivity, owing to the coherence property of lasers [1, 2], while several interferometry techniques, such as Moiré interferometry and speckle pattern interferometry, are widely employed in experimental stress/strain analysis [3, 4]. The suitability of these and other techniques for optical measurements depends on the optical properties of the object under measurement and the nature of the mechanics problems under investigation. The application of such techniques in deformation analysis often requires numerical differentiation of discretely-sampled displacement data which may introduce significant error magnification problems. In addition, many of these methods can be undesirably sensitive to rigid-body rotations and susceptible to ambient vibrations.

One of optical interferometry techniques for optical measurements is wave front shearing interferometry [5] for performing optical differentiations of wave-front phase by using self-referencing common-path interference between two laterally sheared wave-fronts. A typical optical shearing interferometer produces and interferes two spatially shifted replicas of the same, usually distorted wavefront of an optical beam along a direction transverse to the direction of propagation of the wavefront. The interference between the spatially shifted and replicated wavefronts generates an interference pattern representing the spatial distribution of slopes in the wavefront. In an effect, the shearing interferometry performs an optical differentiation of the wavefront and thus can be used to reduce the numerical differentiation of discretely-sampled displacement data and thus reduce errors associated with such numerical differentiation. Another feature of optical shearing interferomety is measurement of a deformation of one point of the wavefront to another of the same wavefront separated by the shearing distance, i.e., the distance between the two interfering replicas of the same wavefront. In this sense, an optical shearing interferometer is a self referencing interferometer and thus provides insensitivity or immunity to vibrations and other perturbations present at the wafer or device under measurement.

In implementations, a shearing interferometer may be configured to produce a shearing interference pattern from either of the optical transmission of the probe beam through the surface or from the optical reflection of the probe beam by the surface. The shearing interference pattern is then processed to obtain surface, slopes, curvatures and other surface topographical information. Examples of measurable surfaces include but are not limited to surfaces in various panels and plates, various substrates and wafers, integrated electronic circuits, integrated optical devices, opto-electronic circuits, and micro-electro-mechanical systems (MEMs), flat panel display systems (e.g., LCD and plasma displays), photolithography masks, pellicles and reticles. Optical shearing interferometry can be implemented in various configurations, including a coherent gradient sensing (CGS) system using optical gratings to cause the shearing of the wavefront (see, e.g., U.S. Pat. No. 6,031,611), a radial shear interferometers, wedge plate in a ai-lateral shearing interferometer (see, e.g., U.S. Pat. No. 5,710,631) and others.

SUMMARY

This application describes, among others, techniques and apparatus for implementing a lateral shearing interferometer to provide whole field mapping of in-plane and out-of-plane displacement field gradients of a sample surface of a sample. In one implementation, symmetric pairs of normally diffracted wave fronts, generated by a specimen grating, are directed to a lateral shearing interferometer where gradient mapping of the individual diffracted wave fronts is conducted. Wave front shearing is achieved and a series of phase shifted fringe patterns is acquired using a CCD imaging system with integrated phase shifting diagnostics. Phase unwrapping algorithms can be applied and de-coupling of the out-of-plane and in-plane displacement field gradients is achieved through linear combinations of specific phase map pairs.

In another implementation, a method for optically characterizing a surface is described to include providing a first optical grating and a second optical grating on a sample surface of a sample, where the first and second optical gratings are along a first grating direction and a second, different direction within the sample surface and spatially overlapping with each other. This method further includes directing a plurality of different optical probe beams to the sample surface at different incident directions, respectively; using at least one optical shearing interferometer to receive diffracted light of the different optical probe beams from the first and the second optical gratings, without interaction between two of the different optical probe beams, to obtain phase-shifted optical shearing interferograms along two different shearing directions at each location that are perpendicular to a normal direction of the sample surface at the location; and processing obtained phase-shifted optical shearing interferograms from the different optical probe beams to generate a map of field gradients for both in-plane and out-of-plane displacements on the sample surface.

In another implementation, a system for optically characterizing a surface is described to include a sample holder for holding a sample having a sample surface on which a first optical grating and a second optical grating are formed to spatially overlap with each other and along a first grating direction and a second, different direction within the sample surface; an optical module to produce and direct a plurality of different optical probe beams to the sample surface at different incident directions, respectively; an optical shearing interferometer module to receive diffracted light of the different optical probe beams from the first and the second optical gratings, without interaction between any two of the different optical probe beams, to obtain phase-shifted optical shearing interferograms along two different shearing directions at each location that are perpendicular to a normal direction of the sample surface at the location; and a signal processor to process obtained phase-shifted optical shearing interferograms from the different optical probe beams to generate a map of field gradients for both in-plane and out-of-plane displacements on the sample surface.

In yet another implementation, a system for optically characterizing a surface is described to include a sample holder, an optical module, a beam control mechanism, an optical shearing device; an optical device, and an optical imaging device. The sample holder is used to hold a sample having a sample surface on which a first optical grating and a second optical grating are formed to spatially overlap with each other and along a first grating direction and a second, different direction within the sample surface. The optical module is used to produce and direct different optical probe beams to the sample surface at different incident directions, respectively. The beam control mechanism is used to control the different optical probe beams to prevent optical interference between two different optical probe beams at the sample surface. The optical shearing device is placed in an optical path of diffracted light of the different optical probe beams from the first and the second optical gratings on the sample surface to interact with received diffracted light of each optical probe beam and to produce a replica of the diffracted light that is spatially shifted by a shearing distance along a direction parallel to the sample surface and the optical shearing device is operable to adjust a phase shift between the diffracted light and the replica. The optical device is to spatially overlap the diffracted light and the replica output from the optical shearing device to produce phase-shifted shearing interferograms from interference of the diffracted light and the replica. The optical imaging device is used to capture images of the phase-shifted shearing interferograms.

The details of one or more embodiments of the invention are set forth in the accompanying drawings and the description below. Other features, aspects, and advantages of the invention will become apparent from the description, the drawings, and the claims.

BRIEF DESCRIPTION OF DRAWINGS

FIG. 1A shows an example of an optical shearing apparatus for obtaining whole field mapping of in-plane and out-of-plane displacement field gradients of a sample surface.

FIG. 1B illustrates an operation flow of the apparatus in FIG. 1A.

FIGS. 2A, 2B, 3, 4A, 4B, 4C and 5 illustrate operations of the apparatus in FIG. 1A where the optical shearing device is implemented by using a coherent gradient sensing (CGS) device having two shearing gratings.

DETAILED DESCRIPTION

Figure 2B:
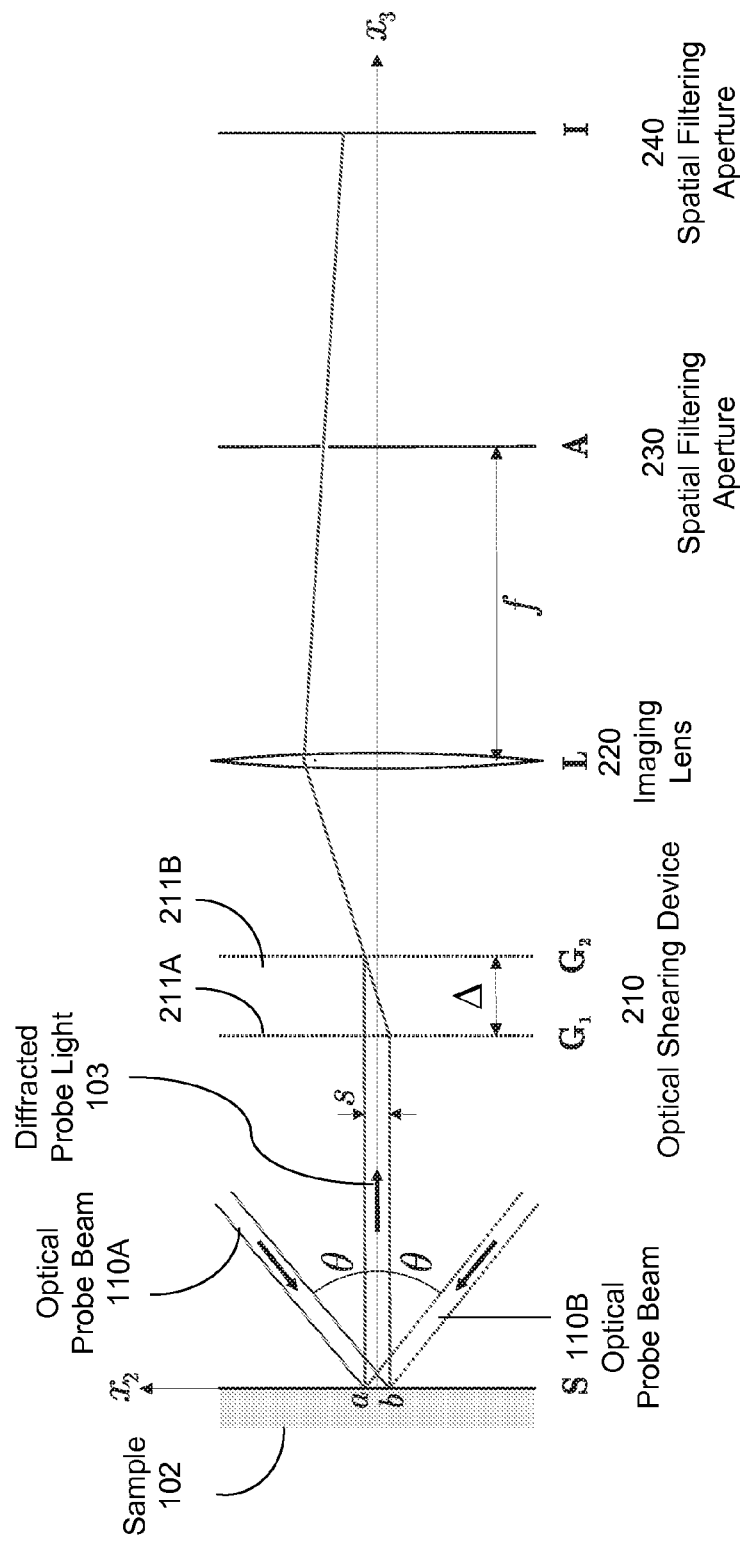

Many shearing interferometers are limited to obtaining surface slope fields, i.e. gradients of the out-of-plane displacement field, and thus do not measure in-plane displacement gradient components, stains and slopes. In-plane displacements can be measured using other techniques. One example is the Moiré interferometer which uses crossed-line diffraction grating on the specimen surface to obtain optical interference of symmetric diffraction orders of two coherent and symmetric optical probe beams interacting with each grating to generate a Moiré fringe pattern. The Moiré fringe pattern includes information on in-plane displacements along a respective grating direction of the grating and is digitally processed to perform numerical differentiation of the in-plane displacements to compute the gradients of the out-of-plane displacement field.

The present lateral sharing techniques described in this application use two optical diffraction gratings along two different grating directions on a sample surface of a sample to reveal the in-plane deformation of the sample surface. A diffraction beam from one optical probe beam from each optical grating is directed into an optical shearing interferometer to perform lateral shearing on the wavefront of the diffraction beam without optically interfering with a diffraction beam of another optical probe beam from the same optical grating. Because the wavefront of such a diffraction beam is distorted by both in-plane displacements and out-of-plane displacements, an optical shearing interferogram by the optical sharing interferometer has information on both the out-of-plane and in-plane displacement field gradients. The out-of-plane and in-plane displacement field gradients in this optical shearing interferogram are coupled together and cannot be separated by processing the optical shearing interferogram alone. To separate out-of-plane and in-plane displacement field gradients, shearing interferograms from at least two different selected optical probe beams are obtained from each of the two gratings on the sample surface and the sharing interferograms from the two gratings are correlated in the signal processing to decouple the out-of-plane and in-plane displacement field gradients. The decoupled out-of-plane and in-plane displacement field gradients are then used to construct a whole field mapping of in-plane and out-of-plane displacement field gradients of the sample surface.

FIG. 1A illustrate an exemplary optical lateral shearing apparatus 100 for implementing the present techniques. FIG. 1B shows an operation of the apparatus in FIG. 1A.

In this example, an optical module 110 is provided to produce and direction optical probe beams to a sample 102 held by a sample holder or stage 101. The sample 102 has a sample surface 102A that is processed to have two spatially overlapped optical diffraction gratings along two different grating directions. For example, one gratings can have grating lines perpendicular to grating lines of the other grating so that the grating direction perpendicular to the grating lines in one grating is perpendicular to the grating direction of the other grating. For each grating, the optical module 110 directs at least two different optical probe beams to the sample 102 to measure the sample surface 102A. Hence, the optical module 110 produces at least four different optical probe beams for measuring the sample surface 102A. As an example, two different optical probe beams 110A and 110B for one of the two gratings are illustrated and are directed to the sample in a plane defined by the normal direction of the sample surface 102A and the grating direction of the respective grating. For convenience of subsequent data processing, each optical probe beam is directed at an incident angle to the respective grating to produce a respective diffracted beam that is normal to the sample surface 102A. For example, the first order diffraction beam can be in the normal direction of the sample surface 102A. The two optical probe beams (e.g., 110A and 110B) can be directed symmetrically from two opposite sides of the normal direction of the sample surface 102A and at a common incident angle with respect to the normal direction. The two optical probe beams are in a plane defined by the grating direction of the respective optical grating and the normal direction to generate two diffracted beams, respectively, at the normal direction.

In FIG. 1A the optical module 110 can include a laser 111 to produce a laser beam which is split into the different optical probe beams that are coherent with one another. In other implementations, the optical module may include two or more lasers that are phase locked to one another to produce the different optical probe beams. In the illustrated example, a beam splitter 112 splits the laser beam from the laser 110 into the optical probe beams 110A and 110B. Optical elements, such as mirrors 113, 114 and 115, can be used to control and direct the optical probe beams to the sample 102 at directed incident angles. In some implementations, an optical beam control mechanism can be used as part of the optical module 110 to control different optical probe beams to illustrate the sample 102 at different times so two different optical probe beams do not appear at the sample 102 at the sample time to interfere with each other. Optical shutters, for example, may be used as this optical beam control. In other implementations, the optical beam control mechanism can control optical polarizations of two optical probe beams interacting with the same grating at the same time to be orthogonal with each other to avoid or minimize optical interference of the two optical probe beams.

An optical shearing interferometer 120 is used in the apparatus 100 to receive and process the diffracted probe light of each optical probe beam. One or more mirrors 116 or other optical elements can be used to direct the diffracted probe light 103 into the optical shearing interferometer 120. The diffracted probe light 103 can be in the same side of the sample surface 102A as illustrated or be a transmission beam on a side of the surface 102A that is opposite to the side where the respective probe beam is directed to the surface 102A. The optical sharing interferometer 120 can be a CGS or a different shearing device and includes an image device such as a sensing array to convert the shearing interference pattern into a sharing interferogram signal 122. A signal processor 130, such as a computer, is used to process the signal 122 and other interferogram signals 122 from other optical probe beams to produce the whole field mapping of out-of-plane and in-plane displacement field gradients.

The apparatus 100 in FIG. 1A an be used to achieve simultaneous whole field mapping of in-plane and out-of-plane displacement gradients. In one implementation, two pairs of obliquely incident probe beams can be used to illuminate a fine pitch crossed-line diffraction grating attached to the sample surface 102A of the sample 102 to produce +1 and −1 diffraction order beams for measuring the sample surface 102A. Unlike a Moiré Interferometer, symmetric pairs of 1$^{st}$ order normally diffracted wave fronts are prevented from mutually interfering and instead are directed to the lateral shearing interferometer 120 where gradient mapping of each individual wave front is conducted. A series of fringe shifted interferograms is acquired for each independent wave front using a an imaging system (e.g., a CCD array) with integrated phase shifting diagnostics and phase unwrapping algorithms are applied through a post processing procedure in order to obtain phase maps of each optically differentiated phase front. De-coupling of the out-of-plane and in-plane displacement field gradients is subsequently achieved through a linear combination of specific phase map pairs.

FIGS. 2A and 2B illustrate an implementation of the apparatus 100 in FIG. 1A. A Cartesian coordinate system x1, x2 and x3 is used where x1 and x2 are two orthogonal in-plane directions and x3 is the direction perpendicular to the plane defined by x1 and x2. The optical shearing interferometer 120 includes an optical shearing device 210, an imaging lens 220, a spatial filter 220 with one or more filtering apertures, and an imaging array 240 at an imaging plane to capture the filtered image and to produce interferogram signals 122 to be processed by the signal processor 130 shown in FIG. 1A. The optical hearing device 210 performs the spatial shearing on the wavefront of the diffracted probe light 103 and the imaging lens 220 images the optical output of the shearing device 210 on the spatial filter 230. One or more apertures in the spatial filter 230 filter one or more selected regions in the interference imaging field to be captured by the imaging array 240 at the imaging plane. In this example, a CGS shearing device with two parallel optical gratings 211A and 211B is used as to perform the lateral sharing of each diffracted probe beam. Examples of CGS shearing devices are described in U.S. Pat. No. 6,031,611, which is incorporated by reference in its entirety as part of the specification of this application. The sample surface is fabricated with f two sets of mutually perpendicular grating lines oriented parallel to orthogonal $x_1$ and $x_2$ axes in the plane of the sample surface 102A.

Figures 1, 6A:
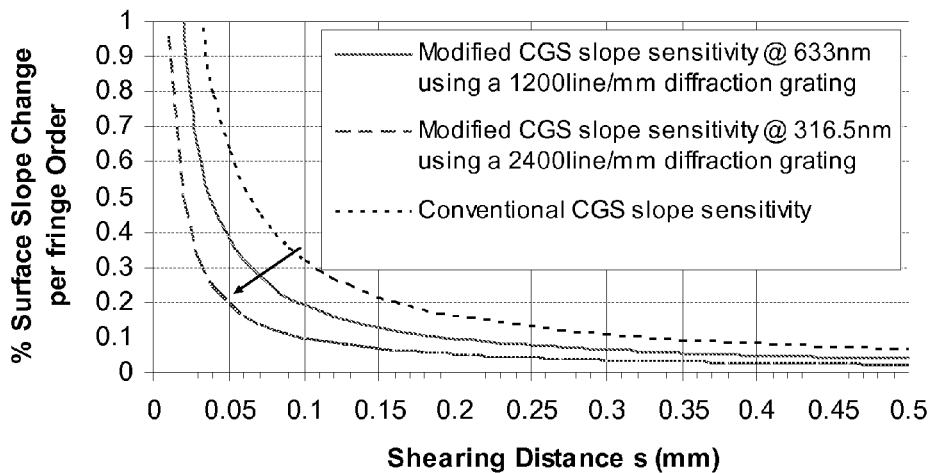
FIGS. 6A and 6B show measurements obtained in an apparatus based on the design in FIG. 1A where the optical shearing device is implemented by using a coherent gradient sensing (CGS) device having two shearing gratings.

As illustrated, a pair of obliquely incident rays 110A and 110B, representing wave vectors of the expanded and collimated laser beams, propagate within the $x_2$-$x_3$ plane and intersect the sample at an angle θ with respect to the surface normal for the sample surface 102A. A second pair of symmetrically incident beams (not depicted) having wave vectors propagating in the orthogonal $x_1$-$x_3$ plane, are also directed to intersect the sample at the same angle θ with respect to the surface normal. The specimen grating lines oriented parallel to the $x_1$ axis diffract the incident beams with wave vectors in the $x_2$-$x_3$ plane and the grating lines oriented parallel to the $x_2$ axis diffract the second pair of illuminating beams with wave vectors in the $x_1$-$x_3$ plane. In both cases, sharp diffraction orders arise which propagate within each respective plane of incidence along directions $\Theta_m$ in accordance with the general grating equation $$\sin\theta_m = \sin\theta_i + m\frac{\lambda}{d} \quad (1)$$

where $\Theta_t$ respects the angle of incidence as depicted in FIG. 1, m is an integer (0,+/−1,+/−2, . . . +/−k) related to a specific diffraction order of interest, λ represents the laser wavelength, and d equals the pitch of the undeformed diffraction grating.

The optical configuration for the apparatus in FIG. 2A can be initially aligned using a master grating element and the incidence angle of both illuminating beam pairs is then precisely adjusted to satisfy the illumination angle condition $$\sin\theta_1 = +/-\left(\frac{j\lambda}{d}\right) \quad (m=j) \quad (2)$$

such that that four symmetric $j^{th}$ order wave fronts emerge normal to the specimen surface in accordance with (1). For example, the diffracted probe light in the primary $1^{st}$ order incidence angles (i.e., the +1 and −1 orders) can be used in some implementations. In general, any pair of symmetric diffraction orders may be selected provided that these diffraction orders exist for a given combination of source wave length and specimen grating pitch. In an effort to satisfy condition (2), the symmetric pairs of normally diffracted $1^{st}$ order beams are allowed to temporarily interfere, one pair at a time, in a moiré interferometer arrangement during this initial alignment process. In a properly aligned configuration, two pairs of normally diffracted beams emerge normal to the specimen surface; (1) the $(u_1,u_3)$ beam pair, derived from diffraction of the illuminating beams having incident wave vectors within the $x_1$-$x_3$ plane and (2) the $(u_2,u_3)$ beam pair, derived from diffraction of the illuminating beams having their incident wave vectors within the $x_2$-$x_3$ plane. When the symmetric (m=±1) diffraction orders comprising either the $(u_1,u_3)$ and $(u_2,u_3)$ beam pairs are allowed to mutually interfere, a complete cancellation of the out-of-plane ($u_3$) phase contribution results and the generated fringe patterns correspond to whole field maps of displacement fields along the two orthogonal in-plane directions $u_1$ and $u_2$, respectively [3]. The optical elements are then precisely adjusted until $u_1$ and $u_2$ null field fringe conditions are independently achieved at which point the precise establishment of the condition (2) is achieved for both illuminating beam pairs. The master grating element is subsequently removed and replaced by a test specimen (i.e., the sample 102) containing an attached replica grating obtained from the very same master grating. The test specimen is then precisely adjusted such that the specimen surface coincides with the same location in space which was previously occupied by the master grating element.

In the diffracted wave front shearing arrangement, the ($u_1$, $u_3$) and ($u_2$,$u_3$) beam pairs are directed to a lateral shearing interferometer. Mutual interference of the normally diffracted wave fronts is prevented through a series of optical shutters and wave front shearing of each individual diffracted wave front is then systematically conducted along a specific axis of interest. When subjected to mechanical loading conditions, the test specimen will naturally experience in-plane and out-of-plane deformations. Non uniformities of the grating pitch will induce optical perturbations within the initially planar diffracted wave fronts which are superimposed with any wave front perturbations induced by out-of-plane displacements ($u_3$). Propagating wave fronts therefore contain coupled phase information about the combined state of deformation at the specimen surface. A series of fringe shifted interferograms is acquired for each diffracted wave front using an imaging system with integrated phase shifting diagnostics and phase unwrapping algorithms are applied through a post processing procedure in order to obtain phase maps of each optically differentiated phase front. De-coupling of the out-of-plane and in-plane displacement field gradients is subsequently achieved through a linear combination of specific phase map pairs.

In an in-plane moiré interferometer, the symmetric (m=±1) diffraction orders comprising the $(u_1,u_3)$ and $(u_2,u_3)$ beam pairs are allowed to mutually interfere in which case a complete cancellation of the out-of-plane ($u_3$) phase contribution results and the generated fringe patterns correspond to whole field maps of horizontal $u_1$ and vertical $u_2$ displacement fields [3]. In the examples shown in FIGS. 1A, 2A and 2B, the interference between two diffracted beams from two different probe beams is prevented and each diffracted beam is optically sheared by the optical shearing device 210 without optically interfering with another diffracted beam of a different optical probe beam. As such, in the examples shown in FIGS. 1A, 2A and 2B, each fringe pattern represents a gradient mapping of the associated optical wave front which contains information about the combined state of in-plane and out-of-plane displacement gradients at the specimen surface. De-coupling of the respective displacement gradient terms is then achieved by the linear combination of specific phase map pairs through a post processing procedure. The diffracted wave front shearing technique can be implemented into an existing moiré interferometry set up as a complementary tool in experimental stress/strain analysis.

In the examples described this application, a CGS lateral shearing interferometer is used for conducting the wave front shearing operation on the diffracted wave fronts [10,11] as an example. A CGS wave front shearing scheme can be advantageously used to provide robust and continuous sensitivity adjustment, and the flexibility to spatially differentiate along any particular direction of interest in some application. The implementations of the apparatus and techniques described in this application are not limited to use of a CGS shearing device. Other non-CGS lateral wave front shearing devices can also be used to implement the apparatus and techniques described in this application. Some examples of non-CGS shearing devices are described in [20] and in U.S. Patent Publication No. US2004/0257587A1 dated Dec. 23, 2004. The entire disclosure of U.S. Patent Publication No. US2004/0257587A1 is incorporated by reference as part of the specification of this application.

FIG. 2B illustrates the working principle of the CGS lateral shearing operation in the apparatus in FIG. 2A. The specimen is illuminated by four, oblique, expanded, and properly collimated laser beams. Among the multiple diffracted beam paths, only the two illuminating beams with wave vectors $k_1$ and $k_2$ in the $x_2$-$x_3$ plane are shown for the sake of clarity. Incident beams intersect the specimen at an angle θ and are subsequently diffracted by the reflective grating $G_0$ on the sample surface. The $1^{st}$ order diffracted beams emerge normal to the specimen surface and are directed to the Coherent gradient Sensing (CGS) lateral shearing interferometer [10].

A ray within the first-order diffracted wave front, emanating from a point a on the specimen surface, is transmitted through the first CGS grating $G_1$ (211A) and diffracted at the second CGS grating $G_2$ (211B). A second ray, which emanates from a neighboring point b at a distance s on the specimen surface is diffracted at the first CGS grating $G_1$ and transmitted through the second CGS grating $G_2$. Both rays then merge and propagate through the imaging system and aperture filter. Following this process, which can be extended to all points on the sample surface, two identical and laterally sheared wave fronts interfere to create a fringe pattern at the image plane I (240) which corresponds to a displacement gradient map of the diffracted optical wave front.

For the sake of clarity and without any loss of generality, we will initially consider the case of a normally diffracted ($u_2$, $u_3$) beam pair which is laterally sheared along the $x_2$ direction, as depicted in FIG. 2B. Results of the derivation are later extended to the ($u_1$, $u_3$) beam pair and to the wave front shearing, parallel to the $x_1$ direction, of either beam pair.

Figure 3:
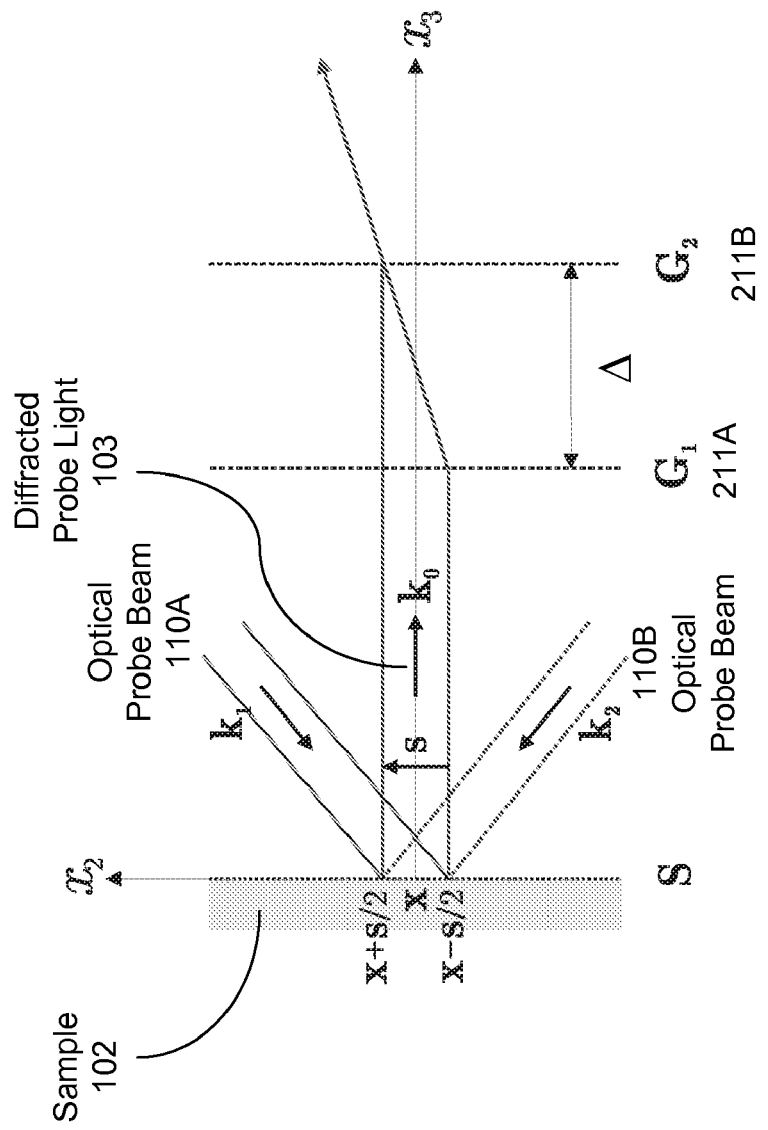

As depicted in FIG. 3, the lateral shearing distance s is equivalent to the physical distance between two arbitrary neighboring points a and b, located on the specimen surface. From a ray optics perspective, two rays of light which originate at each of these points are merged after passing through the pair of parallel CGS instrument gratings. The interference problem is analyzed by modeling the changes in optical path length which result due to the displacements of points a and b and the associated phase change at corresponding points on the laterally sheared interfering wave fronts. Since point a and point b represent arbitrary points on the sample surface, the optical path length descriptions apply to any pair of neighboring points on the specimen surface and the extension to full field solution naturally follows.

Neglecting all common path phase terms and coordinate scaling effects introduced by the imaging optics, the two laterally sheared, interfering wave fronts may be modeled as plane waves and expressed in a symmetric form in accordance with the coordinate description contained in FIG. 3.

$$E_a = E\left(x_1, x_2 + \frac{s_2}{2}, t\right) = A e^{i\{kx_3 - \omega t - \frac{2\pi}{\lambda}(\Delta S(x_1, x_2 + \frac{s_2}{2}, t))\}} \quad (3)$$

$$E_b = E\left(x_1, x_2 + \frac{s_2}{2}, t\right) = A e^{i\{kx_3 - \omega t - \frac{2\pi}{\lambda}(\Delta S(x_1, x_2 - \frac{s_2}{2}, t))\}} \quad (4)$$

Here, A and B represent the plane wave amplitudes, $k=2\pi/\lambda$ is the wave number, $x_3$ represents the propagation distance to the image plane, t represents time, and the phase factor $$\Delta S\left(x_1, x_2 \pm \frac{s_2}{2}, t\right)$$

represents changes in optical path length induced by the displacements which evolve over time at each of the neighboring points a and b which are separated by the lateral shearing distance $s_2$ along the $x_2$ direction.

The interference pattern is derived by taking the time averaged intensity of the combined plane wave fields given by $$\langle I \rangle \propto [E_a + E_b][E_a + E_b]^* \quad (5)$$

where the symbol * denotes the complex conjugate operation, $E_a$ and $E_b$ represent the combining plane wave fields, and the optical constants of proportionality have been suppressed. Substituting for the interfering plane waves from (3) and (4) into (5) leads to the familiar two beam interference expression $$I(x_1, x_2, t) = \quad (6)$$

$$I_a + I_b + 2\sqrt{I_a I_b} \cos\frac{2\pi}{\lambda}\left[\lim_{s \to 0}\left(\Delta S\left(x_1, x_2 + \frac{s_2}{2}, t\right) - \Delta S\left(x_1, x_2 - \frac{s_2}{2}, t\right)\right)\right]$$

where $I_a = E_a E_a$ and $I_b = E_b E_b$ represent the steady state background intensity of each interfering beam. Note that the time averaged intensity relation is expressed here as a limit due to the fact that the quantity $\langle I \rangle$ is actually a function of the optical information collected at neighboring points $$\left(x_1, x_2 - \frac{s_2}{2}\right) \text{ and } \left(x_1, x_2 + \frac{s_2}{2}\right)$$

and can therefore only approximate the intensity at the mid point $(x_1, x_2)$ in the limit that the shearing distance $s_2$ is made sufficiently small. The intensity of the resulting interferograms is modulated by a relative phase term $$|\Psi_{2,3}^{+/-}\rangle_{s_2} = \lim_{s_2 \to 0} \frac{2\pi}{\lambda}\left[\Delta S\left(x_1, x_2 + \frac{s_2}{2}, t\right) - \Delta S\left(x_1, x_2 - \frac{s_2}{2}, t\right)\right] \quad (7)$$

which is proportional to the relative changes in optical length between neighboring points a and b on the specimen surface and where we have adopted the symbolic notation $$|\Psi_{\alpha,3}^{+/-}\rangle_{s_\beta}$$

where $\alpha=1,2$ and $\oplus=1,2$ in order to denote the wave front shearing operation of either $m=\pm 1$ diffraction order comprising the normally diffracted $(u_\alpha, u_3)$ wave fronts with respect to the $x_\beta$ direction.

FIGS. 4A, 4B and 4C depict how the optical path lengths of the normally diffracted wave fronts are altered as an arbitrary point a on the specimen surface shifts to a new location a' in the transverse direction and a" in the normal direction. A similar operation occurs to the displacements at the neighboring point b located at coordinate $$\left(x_1, x_2 - \frac{s_2}{2}, t\right).$$

Assuming that the optical path from the light source to the specimen is the same for every ray within an incident beam, the change of path length ($\Delta S$) of a diffracted ray with respect to an obliquely incident ray at each neighboring point is given by $$\underline{\Delta S\left(x_1, x_2 + \frac{s_2}{2}, t\right)}_{\text{point } a} = \quad (8)$$

$$u_3\left(x_1, x_2 + \frac{s_2}{2}, t\right)[1 + \cos\Theta] \pm \left(u_2\left(x_1, x_2 + \frac{s_2}{2}, t\right)\sin\Theta\right)$$

$$\underline{\Delta S\left(x_1, x_2 - \frac{s_2}{2}, t\right)}_{\text{point } b} = \quad (9)$$

$$u_3\left(x_1, x_2 + \frac{s_2}{2}, t\right)[1 + \cos\Theta] \pm \left(u_2\left(x_1, x_2 - \frac{s_2}{2}, t\right)\sin\Theta\right)$$

where the ± symbols correspond to the individual $m=\pm 1$ diffracted orders which comprise the $(u_2, u_3)$ beam pair. Similar optical path length expressions apply for the $(u_1, u_3)$ beam pair with pairs of neighboring points which are laterally displaced in the $x_2$ direction, and for pairs of neighboring points within either beam pair, which are laterally displaced in the $x_1$ direction. Substituting the optical path length expressions (8,9) into (7) leads to an explicit form of the relative phase term given by $$|\Psi_{2,3}^{+/-}\rangle_{s_2} = \lim_{s_2 \to 0} \frac{2\pi}{\lambda} \left\{ \left( u_3\left(x_1, x_2 + \frac{s_2}{2}, t\right) - u_3\left(x_1, x_2 - \frac{s_2}{2}, t\right) \right)(1 + \cos\Theta) \pm \right. \quad (10)$$

$$\left. \left( u_2\left(x_1, x_2 + \frac{s_2}{2}, t\right) - u_2\left(x_1, x_2 - \frac{s_2}{2}, t\right) \right) \sin\Theta \right\}$$

where the ± symbols correspond to the respective m=±1 diffracted orders and also reflect the fact that the symmetrically diffracted wave fronts experience equal and opposite phase changes in response to a given transverse displacement.

The intensity of the resulting interferograms is therefore modulated by a linear combination of relative differential displacements which take place between pairs of neighboring points on the specimen surface. Clearly, if the shearing distance s is made to equal zero, then there are no optical path length differences between the interfering wave fronts and the interferometer is rendered completely insensitive. On the other hand if s is too large, the interferometer will respond to differential displacements across a broad characteristic length on the specimen surface and fail to accurately capture local displacement gradient behavior. We are therefore primarily interested in the behavior of the lateral shearing interferometer in the limit where s approaches zero, yet remains finite, in order to accurately capture displacement field gradients, i.e out-of-plane slope maps and in-plane strain fields, as a function of position on the specimen surface. Multiplying and dividing (10) by $$\frac{s_\beta}{s_\beta}$$

can be used to obtain an equivalent derivative form of the interferometer output as follows:

$$|\Phi_{2,3}^{+/-}\rangle_{s_2} = \frac{2\pi}{\lambda} \left\{ \left( \frac{\partial u_3(x_1, x_2, t)}{\partial x_2} \right)(1 + \cos\Theta) \pm \left( \frac{\partial u_2(x_1, x_2, t)}{\partial x_2} \right) \sin\Theta \right\} = \quad (11)$$

$$\frac{1}{s_\beta} |\Psi_{2,3}^{+/-}\rangle_{s_2}$$

where $$|\Phi_{\alpha,3}^{+/-}\rangle_{s_\beta}$$

now symbolizes optical differentiation of the normally diffracted $(u_\alpha, u_3)$ wave fronts with respect to the $x_\beta$ direction where $\alpha=1,2$ and $\beta=1,2$. In practice this simply requires scaling the actual interferometer phase output $$|\Psi_{\alpha,3}^{+/-}\rangle_{s_\beta}$$

by the factor $$\frac{1}{s_\beta}.$$

Similar lateral wave front shearing operation can be applied to the spatial differentiation of the $(u_1, u_3)$ beam pair along the same shearing direction:

$$|\Phi_{1,3}^{+/-}\rangle_{s_2} = \frac{2\pi}{\lambda} \left\{ \left( \frac{\partial u_3(x_1, x_2, t)}{\partial x_2} \right)(1 + \cos\Theta) \pm \left( \frac{\partial u_1(x_1, x_2, t)}{\partial x_2} \right) \sin\Theta \right\} = \quad (12)$$

$$\frac{1}{s_\beta} |\Psi_{1,3}^{+/-}\rangle_{s_2}$$

Similarly, we may also consider lateral wave front shearing of either diffracted beam pair along the orthogonal $x_1$ wave front shearing direction as follows:

$$|\Phi_{2,3}^{+/-}\rangle_{\vec{s}_1} = \frac{2\pi}{\lambda} \left\{ \left( \frac{\partial u_3(x_1, x_2, t)}{\partial x_1} \right)(1 + \cos\Theta) \pm \left( \frac{\partial u_2(x_1, x_2, t)}{\partial x_1} \right) \sin\Theta \right\} = \quad (13)$$

$$\frac{1}{s_\beta} |\Psi_{2,3}^{+/-}\rangle_{s_1}$$

$$|\Phi_{1,3}^{+/-}\rangle_{\vec{s}_1} = \frac{2\pi}{\lambda} \left\{ \left( \frac{\partial u_3(x_1, x_2, t)}{\partial x_1} \right)(1 + \cos\Theta) \pm \left( \frac{\partial u_1(x_1, x_2, t)}{\partial x_1} \right) \sin\Theta \right\} = \quad (14)$$

$$\frac{1}{s_\beta} |\Psi_{1,3}^{+/-}\rangle_{s_1}$$

All four cases (11)-(14) may be summarized in a compact form as follows:

$$|\Phi_{\alpha,3}^{+/-}\rangle_{s_\beta} = \frac{2\pi}{\lambda} \left\{ \left( \frac{\partial u_3(x_1, x_2, t)}{\partial x_\beta} \right)(1 + \cos\Theta) \pm \left( \frac{\partial u_\alpha(x_1, x_2, t)}{\partial x_\beta} \right) \sin\Theta \right\} = \quad (15)$$

$$\frac{1}{s_\beta} |\Psi_{\alpha,3}^{+/-}\rangle_{s_\beta}$$

which denotes spatial differentiation of the normally diffracted $(u_\alpha, u_3)$ wave fronts with respect to the $x_\beta$ direction where $\alpha=1,2$ and $\beta=1,2$. Equation (15) therefore represents a total of eight possible phase maps which can be obtained through the optical differentiation of normally diffracted wave fronts. Perhaps most importantly, the form of (15) clearly suggests that de-coupling of the in-plane and out-of-plane displacement gradient terms may be achieved through the addition or subtraction of symmetric m=±1 phase terms, provided that a suitable procedure is available for extracting whole field phase information from each laterally sheared diffracted wave front. Wave front shearing along other off-axis directions can also be performed.

Phase shifting techniques can be used to extract whole field phase information contained within generated interference patterns [20]. In quasi-static testing applications, phase shifting of the individual laterally sheared diffracted wave fronts and their associated interferograms may be executed in a sequential fashion. Under dynamic test conditions however, where the phase front evolves rapidly in time, instantaneous phase shifting schemes can be used to simultaneously capture all of the phase-shifted interferograms as expressed by (15) without any significant time lag between measurements. Several such dynamic phase shifting schemes have been developed in related applications and are addressed in the literature [20].

Phase shifting may be implemented to progressively adjust the phase separation between the two shifted interfering wavefronts which cycles or manipulates fringe position on the specimen's surface under measurement. In one implementation, a shearing interferometer may be configured to obtain multiple phased images of a patterned wafer's surface, for example at 0, 90, 180, 270 and 360 degrees in phase. The phase shifting method allows for the wavefront slope to be measured by calculating the "relative phase" modulation at each pixel on a detector array that receives the interference pattern. The phase shifting method also allows for consistent interpretation of wavefront and specimen slope on a surface that exhibits changing reflectivity, like those found on patterned wafers. On a patterned wafer surface, each pixel location on the specimen may reflect light with a varying degree of intensity relative to other pixel locations. This may complicate the interpretation of any single shearing interferogram. The phase shifting method in shearing interferometry can simultaneously increase the accuracy of the slope resolution and allow for accurate interpretation of interferograms on patterned surfaces with a spatially varying optical reflectivity. This is possible in part because the relative phase of each pixel or location within the shearing interfering pattern rather than merely the variation in the fringe intensity is measured.

In implementation of the phase shifting, the collected multiple phase-shifted interferograms are subsequently processed by a phase extraction algorithm and a unwrapping algorithm to accurately interpret the surface slopes embedded in the phase-shifted interferograms. Once the phase-shifted interferograms have been unwrapped, the interpretation of raw slope data and the derivation of curvature may be enhanced by statistically fitting a surface polynomial to the raw slope data. Statistical surface fits, including Zernicke polynomials and Legendre polynomials, may be applied to raw slope data derived from Patterned Wafers for the purpose of deriving topography (or nanotopography) and curvature data.

One property of the shearing interferometry due to its self-referencing nature is that the resulting shearing interference pattern essentially measures the deviations from flatness of the surface under measurement by using the surface itself as a reference surface. Such relative data on surface height or flatness may be useful in various applications where the height or flatness of a surface is monitored or controlled. For example, in a chemical mechanical polishing (CMP) process or other surface polishing processes, the relative height across the surface may be monitored to determine the effectiveness of the polishing process. A shearing interferometer may be used to monitor the surface flatness and the measurements may be used to dynamically control the polishing condition of the polishing process in real time.

In some implementations, the shearing distance between the transversely shifted wavefronts that interfere with each other may be adjusted during the measurement process to improve the resolution and accuracy of the data. By capturing interferometric images of the surface at multiple increments of shearing distances, it is possible to resolve features smaller than the effective pixel size of the camera or imaging sensing array being used to sample the interferometric data. In addition, as described later in this application, the use of multiple shearing distances enables the highly accurate calculation of the estimated surface topography or nanotopography from the relative data by a geometric calculation rather than a standard numerical integration algorithm to compute the actual surface profile.

The phase shifting in a two-grating CGS shearing device may be achieved by changing the relative position between the two gratings 211A and 211B. In one implementation, the relative position of the two gratings in the transverse plane defined by directions x1 and x2 may be adjusted while maintaining the spacing between the two gratings along the x3 direction fixed at a desired constant. A positioning mechanism, such as precise translation stage or a positioning transducer, can be used to implement this adjustment of the relative position between the gratings for phase shifting. At least one lateral position controller may be engaged to one of the two gratings to cause the lateral change in position. Two lateral position controllers may be respectively engaged to the two gratings to cause the phase shift. In this implementation, the two gratings may be maintained to be parallel to each other with the fixed spacing during the lateral movement. Multiple shearing interference patterns with different lateral relative positions between the gratings can be obtained for further processing with phase extraction and unwrapping algorithms. Alternatively, the relative lateral position between the two gratings can be fixed and a position control mechanism is implemented to slightly change the spacing between the two gratings along the x3 direction by a small amount much less than the desired spacing so the spacing and the measurement resolution are not significantly affected by the small change. This small change in the spacing between two gratings changes the overall phase of the shearing interference pattern produced by the two gratings. In data acquisition, the spacing is adjusted to have different small shifts to obtain different shearing interference patterns with different phase shifts for further processing with phase extraction and unwrapping algorithms.

To demonstrate the lateral wave front shearing scheme for the combined whole field mapping of in-plane and out-of-plane displacement gradients, a three-step phase shifting procedure was adopted by inducing a series of incremental transverse movements of one CGS diffraction grating with respect to the other, through the use of a calibrated PZT actuator. Three phase shifted interferograms, each offset by a phase shift increment $\alpha$, were acquired for each individual wave front sheared diffraction order. The intensity of the interferograms comprising a three-step phase shift sequence may be mathematically expressed as $$I_j(x_1,x_2,t;s_\beta)=I_m+I_a\cos\lfloor s\Phi(x_1,x_2,t;s_\beta)-(j\eta)\rfloor j=-1,0,1 \quad (16)$$

where the shearing distance factor s has been reintroduced within the phase term along side $\Phi(x_1,x_2,t;s_\beta)$ in order to retain a dimensionless phase term and to recapture the fact that the interferometer output is actually modulated by differential displacements. $I_j(x_1,x_2,t;s_\beta)$ represents the intensity distribution of each phase shifted interferogram, $I_a$ is intensity amplitude, $I_m$ is the mean intensity level, $s_\beta$ represents the general wave front shearing distance along the $x_\beta$ direction where $\beta=1,2$, and $\eta$ represents the induced phase step increment. Phase maps of the individual diffracted wave fronts, corresponding to the quantities expressed in (15), are obtained by applying the three step phase shift algorithm [20]

$$\Phi(x_1, x_2, t; s_\beta) = \frac{1}{s_\beta}\tan^{-1}\left\{\left[\frac{1-\cos\alpha}{\sin\alpha}\right]\left[\frac{I_{-1}(x_1, x_2, t; s_\beta) - I_1(x_1, x_2, t; s_\beta)}{2I_0(x_1, x_2, t; s_\beta) - I_{-1}(x_1, x_2, t; s_\beta) - I_1(x_1, x_2, t; s_\beta)}\right]\right\} \quad (17)$$

to each sequence of phase shifted interferograms. The ratio of the signal intensity amplitude to the mean intensity of the recorded signals defines the modulation of the phase measurements in the interference pattern and is given by $$\gamma = \frac{I_a}{I_m} = \frac{\sqrt{\{[1-\cos\alpha](I_{-1} - I_1)\}^2 + [\sin\alpha(2I_0 - I_{-1} - I_1)]^2}}{[I_{-1} + I_1 - 2I_0\cos\alpha]\sin\alpha} \quad (18)$$

The uncertainty in the quantitative phase measurements may be represented as $$d\Omega \gg \frac{dI}{\gamma} \quad (19)$$

where dI represents the smallest resolvable intensity change. Often times the signal modulation may be less than the ideal value of unity due to unequal beam intensities. Moreover, there are numerous other noise sources which can affect measurement accuracy such as errors in the mechanical phase shifting process, nonlinearities in the detection system, stability of the light source, quantization errors in the digital-to-analog conversion process, mechanical vibration, air turbulence, extraneous ghost fringes, and any wave front slope errors associated with the actual interferometer optics [20]. Once all of the aforementioned error sources are considered, it is more realistic to encounter a phase uncertainty of more like $$d\Omega > \frac{\pi}{50}$$

in actual practice, which is still far more accurate than what is achieved through the use of manual fringe counting techniques.

Once the individual whole field phase maps corresponding to the optically differentiated wave fronts (15) are acquired, the displacement field gradient terms are subsequently decoupled through the linear combination of the unwrapped symmetric (m=±1) phase map pairs in a post processing step as follows $$\frac{\partial u_3(x_1, x_2, t)}{\partial x_\beta} = \frac{\lambda}{4\pi(1+\cos\Theta)}\underbrace{\left\{|\Phi_{\alpha,3}^{(+)}\rangle_{s_\beta} + |\Phi_{\alpha,3}^{(-)}\rangle_{s_\beta}\right\}}_{\text{UNWRAPPED } m=\pm 1 \text{ PHASE TERMS ADDED}} \quad (20)$$

$$\frac{\partial u_\alpha(x_1, x_2, t)}{\partial x_\beta} = \frac{\lambda}{4\pi(\sin\Theta)}\underbrace{\left\{|\Phi_{\alpha,3}^{(+)}\rangle_{s_\beta} - |\Phi_{\alpha,3}^{(-)}\rangle_{s_\beta}\right\}}_{\text{UNWRAPPED } m=\pm 1 \text{ PHASE TERMS SUBTRACTED}} \quad (21)$$

An inspection of (20) reveals that two independent measurements of the same surface slope component may be obtained through lateral shearing of the normally diffracted beams arising from either the $(u_1,u_3)$ or $(u_2,u_3)$ beam pairs. For example, two independent whole field maps of surface slope $$\frac{\partial u_3}{\partial x_1}$$

may be generated as follows:

$$\frac{\partial u_3(x_1, x_2, t)}{\partial x_1} = \left(\frac{\lambda}{4\pi(1+\cos\Theta)}\right)\left\{|\Phi_{1,3}^+\rangle_{s_1} + |\Phi_{1,3}^-\rangle_{s_1}\right\} \text{ or,} \quad (22)$$

$$\frac{\partial u_3(x_1, x_2, t)}{\partial x_1} = \left(\frac{\lambda}{4\pi(1+\cos\Theta)}\right)\left\{|\Phi_{2,3}^+\rangle_{s_1} + |\Phi_{2,3}^-\rangle_{s_1}\right\} \quad (23)$$

In a similar manner, two independent measurements of $$\frac{\partial u_3}{\partial x_2}$$

may also be obtained through lateral wave front shearing of either the $(u_1,u_3)$ or $(u_2,u_3)$ beam pairs along the $x_2$ direction along with subsequent addition of symmetric phase terms as follows:

$$\frac{\partial u_3(x_1, x_2, t)}{\partial x_2} = \left(\frac{\lambda}{4\pi(1+\cos\Theta)}\right)\left\{|\Phi_{1,3}^+\rangle_{s_2} + |\Phi_{1,3}^-\rangle_{s_2}\right\} \text{ or,} \quad (24)$$

$$\frac{\partial u_3(x_1, x_2, t)}{\partial x_2} = \left(\frac{\lambda}{4\pi(1+\cos\Theta)}\right)\left\{|\Phi_{2,3}^+\rangle_{s_2} + |\Phi_{2,3}^-\rangle_{s_2}\right\} \quad (25)$$

The pairs of solutions expressed by (22)-(25) for the surface slope terms $$\frac{\partial u_3}{\partial x_1} \text{ or } \frac{\partial u_3}{\partial x_2}$$

do not represent redundant measurements. Instead, each pair of solutions is uniquely obtained by an independent pair of orthogonally oriented illuminating beams which sample the specimen surface from different directions. It should therefore be possible to further combine these independent phase solutions together in order to achieve greater overall measurement sensitivity in cases where increased resolution is desired. This point is further addressed in the next section where the effective instrument sensitivity is considered.

Whole field mapping of in-plane gradients and strain fields is achieved through the subtraction of symmetric phase terms in accordance with (21) as follows:

$$\varepsilon_{11}(x_1, x_2, t) = \frac{\partial u_1(x_1, x_2, t)}{\partial x_1} \approx \left(\frac{\lambda}{4\pi(\sin\Theta)}\right)\{|\Phi_{1,3}^+\rangle_{s_1} - |\Phi_{1,3}^-\rangle_{s_1}\} \quad (26)$$

$$\varepsilon_{22}(x_1, x_2, t) = \frac{\partial u_2(x_1, x_2, t)}{\partial x_2} \approx \left(\frac{\lambda}{4\pi(\sin\Theta)}\right)\{|\Phi_{2,3}^+\rangle_{s_2} - |\Phi_{2,3}^-\rangle_{s_2}\} \quad (27)$$

$$\frac{\partial u_1(x_1, x_2, t)}{\partial x_2} \approx \left(\frac{\lambda}{4\pi(\sin\Theta)}\right)\{|\Phi_{1,3}^+\rangle_{s_2} - |\Phi_{1,3}^-\rangle_{s_2}\} \quad (28)$$

$$\frac{\partial u_2(x_1, x_2, t)}{\partial x_1} \approx \left(\frac{\lambda}{4\pi(\sin\Theta)}\right)\{|\Phi_{2,3}^+\rangle_{s_1} - |\Phi_{2,3}^-\rangle_{s_1}\} \quad (29)$$

$$\gamma_{12} \approx \left(\frac{\lambda}{4\pi(\sin\Theta)}\right)\{|\Phi_{1,3}^+\rangle_{s_2} - |\Phi_{1,3}^-\rangle_{s_2}\} + \left(\frac{\lambda}{4\pi(\sin\Theta)}\right)\{|\Phi_{2,3}^+\rangle_{s_1} - |\Phi_{2,3}^-\rangle_{s_1}\} \quad (30)$$

where (30) represents shear strain term $\gamma_{12}$, obtained by adding the displacement field cross gradient terms (28) and (29).

The following sections discuss effective instrument sensitivity to the measurement of surface slopes and in-plane gradients as a function of shearing distance ($s_\beta$), source wave length ($\lambda$), and diffraction angle ($\theta$).

The process of generating de-coupled displacement field gradients through the linear combination of phase information as expressed by (20) and (21) is analogous to having two independent "virtual" lateral shearing interferometers working in tandem, one of which outputs surface slope information and a second virtual instrument which yields in-plane displacement gradients. Under this analogy, we can postulate the existence of a virtual fringe pattern for the decoupled out-of-plane displacement gradient field in accordance with (20) as follows $$I_3(x_1, x_2, t) = I_m + I_a\cos\{s_\beta(|\Phi_{\alpha,3}^+\rangle_{s_\beta} + |\Phi_{\alpha,3}^-\rangle_{s_\beta})\} \text{ or,} \quad (31a)$$

$$I_3(x_1, x_2, t) \approx I_m + I_a\cos\left\{\frac{4\pi s_\beta}{\lambda}(1+\cos\Theta)\left(\frac{\partial u_3(x_1, x_2, t)}{\partial x_\beta}\right)\right\}\beta = 1, 2 \quad (31b)$$

Virtual fringe order relationships defining isocontours of surface slope on the specimen surface are defined by $$\frac{\partial u_3(x_1, x_2, t)}{\partial x_i} \approx \frac{1}{s_\beta}\left\{\frac{\lambda}{2(1+\cos\Theta)}\right\}N, 1 = 1, 2 \quad (32)$$

where N is an integer representing a $2\pi N$ "fringe shift" within the virtual fringe pattern.

The effective instrument sensitivity to changes in surface slope is seen to range from $$\frac{\lambda}{2s_\beta}$$

{slope change per fringe order} at the impractical grazing incidence case, as $\Theta \to 90°$, to $$\frac{\lambda}{4s_\beta}$$

{slope change per fringe order} in the limit of shallow beam angles as $\Theta \to 0°$. A classical wave front shearing interferometer, by comparison, operating on a single normally reflected beam, generates surface slope isocontours given by $$\left[\frac{\partial u_3(x_1, x_2, t)}{\partial x_\beta}\right] = \frac{\lambda N}{2s_\beta}, \text{ where } \beta = 1, 2 \quad (33)$$

The diffracted wave front shearing technique is therefore more sensitive to the measurement of surface slopes than traditional wave front shearing interferometers owing to the presence of the $1+\cos\Phi$ factor in the denominator of (32). The sensitivity increase results from the fact that surface slope, as measured using the modified lateral shearing arrangement, is obtained by combining phase information from two independent plane wave fronts which independently sample the specimen surface. The effect is completely analogous to the manner in which the sensitivity of a conventional lateral shearing interferometer may be doubled by inducing a second reflection at the specimen surface. Indeed, the modified lateral shearing measurement sensitivity value of $$\frac{\lambda}{4s_\beta}$$

{slope change per fringe order} in the limit of very shallow diffraction angles is identical to the sensitivity of a classical lateral wave front shearing interferometer operating on a normally reflected wave front which has suffered a double reflection at the specimen surface.

We further consider the two independent measurements of each surface slope component, either $$\frac{\partial u_3}{\partial x_1} \text{ or } \frac{\partial u_3}{\partial x_2},$$

obtained through wave front shearing and phase term addition of the $(u_1, u_3)$ and $(u_2, u_3)$ beam pairs as expressed by (22-25). As previously suggested, we may consider adding the two independent phase measurements together in order to double the overall measurement sensitivity in cases where increased resolution is desired. The effective measurement sensitivity in this case would range from $$\frac{\lambda}{4s_\beta}$$

{slope change per fringe order} at the (impractical) grazing incidence case, where illumination angles approach $\Theta=90°$, to $$\frac{\lambda}{8s_\beta}$$

{slope change per fringeorder} in the limit of very shallow illumination angles. In this case the sensitivity amplification effect is analogous to the manner in which the sensitivity of a conventional lateral shearing interferometer may be quadrupled through a series of four reflections of a normally incident beam at the specimen surface.

A similar approach is taken in order to define the effective virtual instrument sensitivity to the measurement of in-plane displacement gradients. We may postulate the existence of a virtual fringe pattern for the decoupled in-plane displacement gradient field in accordance with (21) as follows $$I_\alpha(x_1, x_2, t) = I_m + I_a \cos\left\{s_\beta\left(|\Phi^+_{\alpha,3}|_{s_\beta} - |\Phi^-_{\alpha,3}|_{s_\beta}\right)\right\} \text{ or,} \quad (34a)$$

$$I_\alpha(x_1, x_2, t) \approx I_m + I_a \cos\left\{\frac{4\pi s_\beta}{\lambda}\sin\Theta\left(\frac{\partial u_\alpha(x_1, x_2, t)}{\partial x_\beta}\right)\right\} \alpha = 1, \quad (34b)$$
$$2\beta = 1, 2$$

Virtual fringe order relationships defining isocontours of in-plane gradients (strains) on the specimen surface are therefore defined by $$\frac{\partial u_\alpha(x_1, x_2, t)}{\partial x_\beta} \approx \frac{1}{s_\beta}\left\{\frac{\lambda}{2\sin\Theta}\right\}N, \alpha = 1, 2; \beta = 1, 2 \quad (35)$$

The effective virtual instrument sensitivity to in-plane gradients (strain) therefore ranges from $$\frac{\lambda}{2s_\beta}$$

{strain change per fringe order} at the (impractical) grazing incidence case, where the illumination angles approach $\Theta=90°$, to $\infty$ in the limit of extremely shallow illumination angles approaching $\Theta=0°$, in which case the interferometer is rendered completely insensitive. As a point of reference, when operating at an illumination angle of ~49.4 degrees, corresponding to the $1^{st}$ order diffraction angle of a $$1200\frac{\text{line}}{\text{mm}}$$

grating with a source wavelength of $\lambda=633$ nm, the effective instrument sensitivity is already at ~76% of its theoretical limiting value. Hence, it is immediately evident that there are diminished returns from the use of finer pitch gratings requiring more extreme diffraction angles.

Although the virtual in-plane gradient interferometer output has no direct wave front shearing counterpart to which it can be directly compared, it is of interest to note that the effective instrument sensitivity to a unit change in slope is equal in magnitude to the fundamental in-plane displacement sensitivity of an in-plane moiré interferometer and other diffraction grating based interferometers such as the transverse displacement interferometer (TDI) [21] and the variable sensitivity displacement interferometer (VSDI) [22].

The sensitivity limits presented here for surface slope and in-plane gradient measurements as captured by (32) and (35) represent an ultimate figure of merit which may be achieved through the lateral shearing of diffracted wave fronts and the subsequent linear combination of phase information. In actual practice the effective instrument resolution may be compromised somewhat by spatial noise and the imprecise registration of phase maps due to rigid body rotations. Care should therefore be taken to minimize these effects both while acquiring actual fringe patterns and during the post processing of phase map information.

In the following sections, we further consider the effective instrument sensitivity to the measurement of surface slopes and in-plane gradients as a function of shearing distance ($s_\beta$), source wave length ($\lambda$), and specimen grating pitch (d).

In the above discussions, the effective virtual instrument sensitivities have been considered without any reference to the frequency (or pitch) of the specimen grating. When considering the effective instrument sensitivity as defined by (32) and (35), it is important to note the grating pitch d can vary as $\lambda$ and $\Theta$ are varied in accordance with the illumination angle condition (2). Hence one cannot arbitrarily vary $\lambda$ and $\Theta$ while assuming a fixed specimen pitch d.

The effective instrument sensitivity to changes in surface slope (32) may be recast in terms of the specimen grating pitch (d) through a simple substitution of the illumination angle condition (2) to yield the general form $$\frac{\partial u_3(x_1, x_2, t)}{\partial x_\beta} = \frac{\lambda}{2s_\beta\left\{1 + \sqrt{1-\left(\frac{j\lambda}{d}\right)^2}\right\}}N, \beta = 1, 2 \quad (36)$$

where $j=\pm 1, \pm 2, \ldots \pm n$ corresponds to the specific diffraction orders employed in the diffracted wave front shearing arrangement (typically $j=\pm 1$).

The upper graph in FIG. 6A displays surface slope sensitivity curves plotted as a function of shearing distance $s_\beta$. The curves displayed in FIG. 6A can represent a lateral wave front shearing interferometer used to conduct gradient mapping of diffracted wave fronts and is useful for gauging whether the shearing distance $s_\beta$, required to achieve desired instrument sensitivity, is suitably matched to the characteristic lengths within a given experimental application. The arrow in the figure highlights the trend of increased instrument sensitivity as we shift from case 1 to case 3. The dashed black (highest) curve corresponds to conventional wave front shearing of a single normally reflected beam of wave length 633 nm. The solid red, (middle) curve corresponds to the effective instrument sensitivity of the diffracted wave front shearing technique using $1^{st}$ order normally diffracted wave fronts generated by a $$1200\frac{\text{line}}{\text{mm}}$$

specimen grating at $\lambda=633$ nm. Using this combination of source wave length and associated diffraction angle, the diffracted wave front shearing technique is found to be $\approx 1.65\times$ more sensitive than a conventional lateral shearing interferometer applied to a single normally reflected beam at the same wave length. Case (3) considers the situation where the source wavelength and specimen grating pitch are both reduced by one-half in order to hold the diffraction angle $\Theta$ constant. The resulting curve may be viewed as a practical upper bound on the theoretical instrument sensitivity in the limit of a very short source wave length of $\lambda=316.5$ nm (near ultra-violet). In this instance the effective instrument sensitivity to changes in surface slope is now defectively doubled with respect to case (2) in accordance with (36) and 3.3× more sensitive than a conventional lateral shearing arrangement applied to a single normally reflected beam at the originally considered 633 nm wave length.

Consider that the slope sensitivity curves in FIG. 6A do not account for the possibility of combining all four phase maps comprising either pair of independent surface slope solutions, $$\frac{\partial u_3}{\partial x_1} \text{ or } \frac{\partial u_3}{\partial x_2},$$

in which case the overall sensitivity in the diffracted wave front shearing cases would be theoretically doubled. The effective instrument sensitivity to in-plane displacement gradients (strains) (35) may be recast in terms of the specimen grating pitch (d) through a simple substitution of the illumination angle condition (2) to yield the general form $$\frac{\partial u_\alpha(x_1, x_2, t)}{\partial x_\beta} = \frac{1}{s_\beta}\left\{\frac{d}{2j}\right\}N, \alpha = 1, 2; \beta = 1, 2 \quad (37)$$

where j+±1,±2, . . . ±n corresponds to the specific diffraction orders employed in the diffracted wave front shearing arrangement. As previously mentioned, it is customary to work with the j=±1 diffraction orders, especially when working with fine pitched gratings, mainly due to the fact that higher diffraction orders may not exist at the operating wave length. Consider that according to (2), the 90-degree grazing incidence condition results in the limit that the grating pitch approaches the wavelength of the operating light source. The operating laser wavelength therefore defines the finest grating pitch that can sustain diffraction at that wave length. In the case of 633 nm light, a grating frequency of approximately 1580 line/mm will therefore generate the grazing incidence angle condition. As a point of reference, it is common practice to employ a $$1200\frac{\text{line}}{\text{mm}}$$

grating at λ=633 nm, in which case the instrument is already operating at ~76% of the maximum theoretical sensitivity at this wave length. At the opposite end of the visible spectrum, the 413.1 nm (deep violet) Argon ion laser line requires a grating frequency of 2421 line/mm in order to achieve the same, impractical, grazing incidence condition. Hence, although mathematically possible, it is physically impractical to double the effective instrument sensitivity to the measurement of in-plane displacement gradients by simply decreasing the source wave length of visible light. Clearly, there are diminished gains in sensitivity which result from the use of finer pitch gratings requiring more extreme diffraction angles and/or a decrease of the source wavelength within the visible portion of the optical spectrum. Only by shifting the wavelength from the visible end down into the near ultra violet portion of the spectrum can a practical and significant enhancement of sensitivity result.

The lower graph in FIG. 6A displays in-plane displacement gradient sensitivity curves plotted as a function of shearing distance $s_\beta$ for two extreme cases of lateral wave front shearing. The curves displayed in FIG. 6A can apply to any lateral wave front shearing interferometer used to conduct gradient mapping of diffracted wave fronts and are useful for gauging whether the shearing distance s, required to achieve desired instrument sensitivity, is suitably matched to the characteristic lengths within a given experimental application. The solid red, (middle) curve corresponds to the effective instrument sensitivity of the diffracted wave front shearing technique using $1^{st}$ order normally diffracted wave fronts generated by a $$1200\frac{\text{line}}{\text{mm}}$$

specimen grating at λ=633 nm. The dashed violet (lower) curve corresponds once again to the near ultra-violet case (λ316.5 nm), where $1^{st}$ order beams are diffracted by a $$2400\frac{\text{line}}{\text{mm}}$$

specimen grating. Note as well we could have equivalently considered employing $2^{nd}$ order diffracted beams at this wave length using a $$1200\frac{\text{line}}{\text{mm}}$$

specimen grating. The near ultra-violet wavelength case is particularly noteworthy to consider since it suggests a practical upper bound on instrument sensitivity which may be physically achieved with the aid of an index matching fluid in an immersion interferometer similar to the microscopic moiré interferometer arrangement developed by Han and co-workers [3].

The following sections describe effective CGS instrument sensitivity to measurement of surface slopes and in-plane gradients as a function of the instrument grating separation (Δ), instrument grating pitch (p), source wave length (λ), and specimen grating pitch (d). We now consider instrument sensitivity in the specific case where a CGS lateral shearing interferometer is applied to gradient mapping of diffracted wave fronts. The effective "virtual" CGS instrument sensitivities are now defined in terms of the physical pitch p and separation Δ between the pair of parallel instrument gratings $G_1$ and $G_2$. With reference to the ray diagram in FIG. 5 the interfering wave fronts are laterally displaced by a shearing distance s' given by $$s' = \Delta\frac{\lambda}{p} = s_\beta\cos\alpha \quad (38)$$

Figure 5:
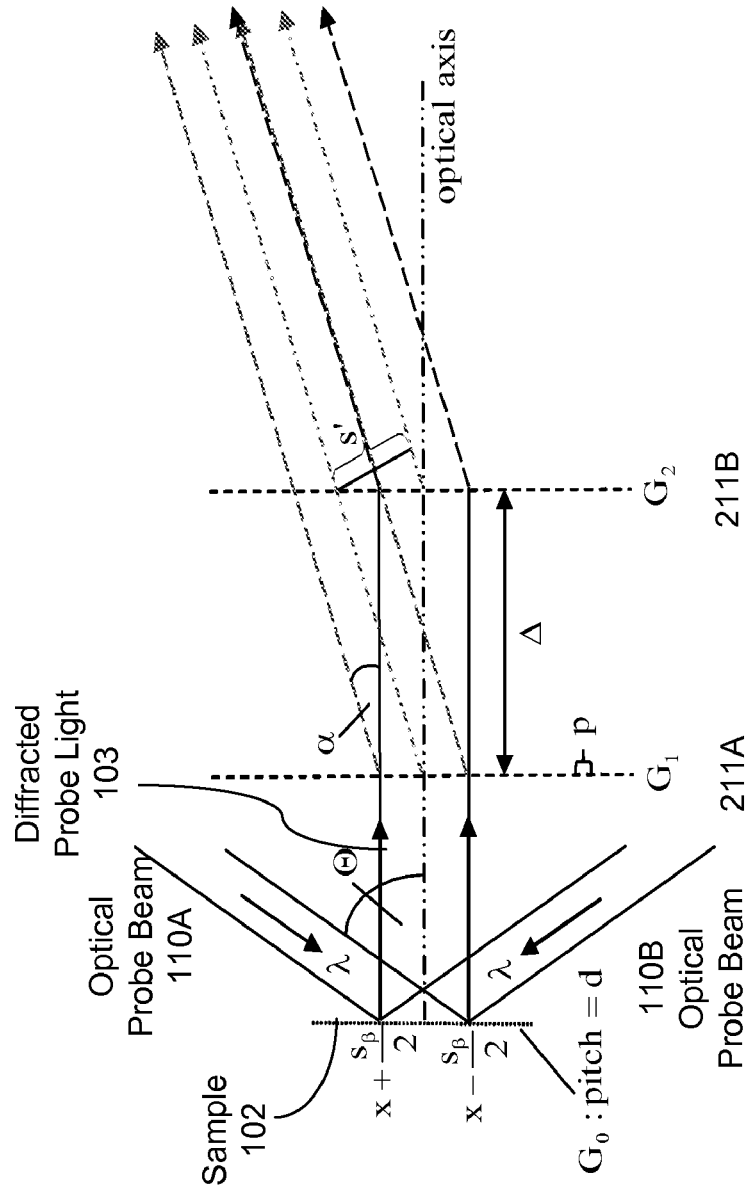

Note that the actual lateral wave front shearing distance s' in FIG. 5 is related to the physical separation $s_\beta$ between neighboring points on the specimen surface through the cos α correction factor. However, the cosine correction term may be generally ignored in most CGS applications since the diffraction angles induced by the CGS instrument gratings are generally quite shallow and the cosine of the angle is nearly unity.

Substituting for the shearing distance $s_\beta$ (38) into (36) yields an effective CGS instrument sensitivity to changes in surface slope given by $$\frac{\partial u_3(x_1, x_2, t)}{\partial x_\beta} = \frac{p}{2\Delta}\left\{1 + \sqrt{1 - \left(\frac{j\lambda}{d}\right)^2}\right\}^{-1} N \quad \beta = 1, 2 \qquad (39)$$

Similarly, substitution of (38) into (37) leads to an effective CGS instrument sensitivity to in-plane displacement gradients given by $$\frac{\partial u_\alpha(x_1, x_2, t)}{\partial x_\beta} = \frac{p}{2j\Delta}\left\{\frac{d}{\lambda}\right\} N \quad \alpha = 1, 2; \beta = 1, 2 \qquad (40)$$

Figures 2, 6A:
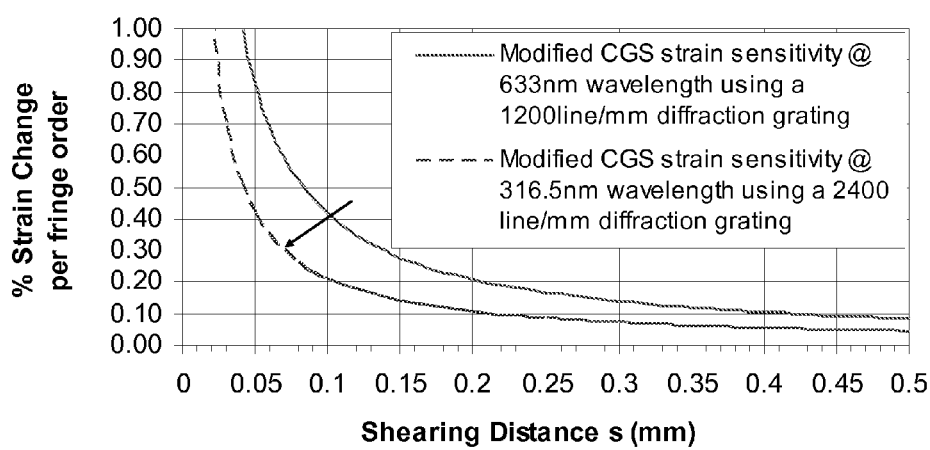
Figures 1, 6B:
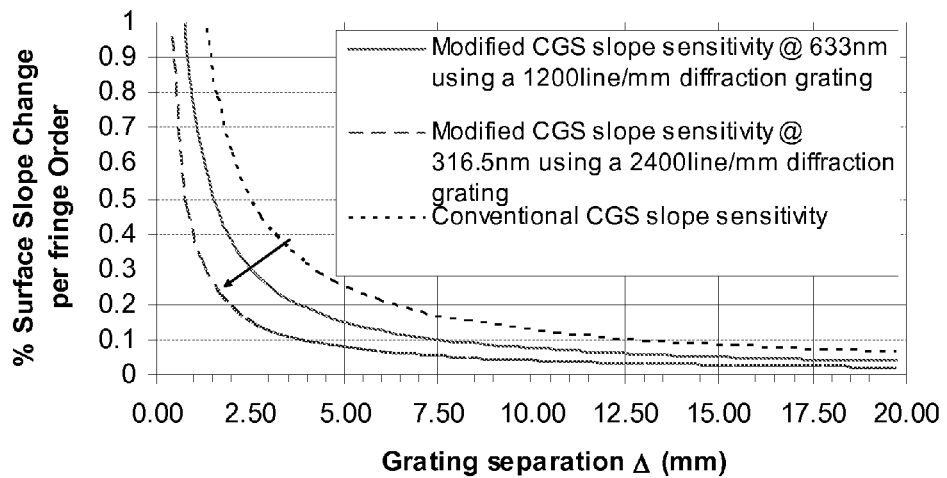
Figures 2, 6B:
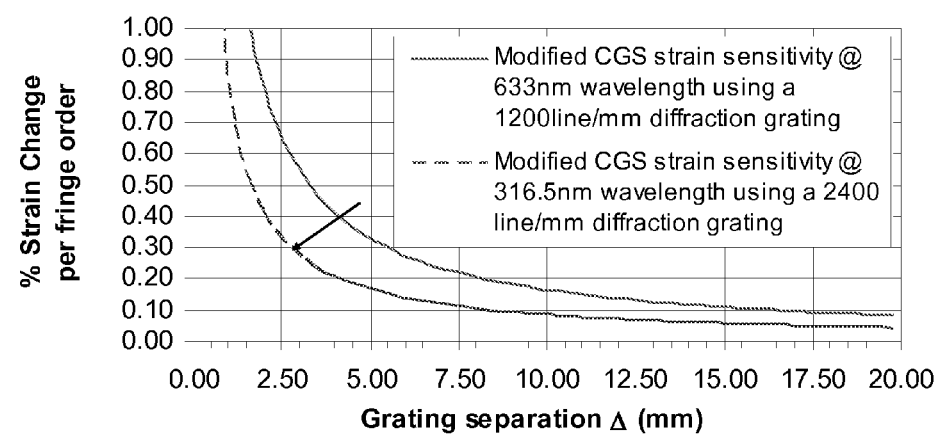

Surface slope and in-plane strain sensitivity curves derived for j=±1 diffraction orders are plotted in FIG. 6B as a function of the grating separation A for the same range of conditions considered in FIG. 6A.

In order to demonstrate the applicability of the proposed CGS technique to whole-field mapping of in-plane and out-of-plane displacement gradients, a series of experiments were conducted by measuring in-plane strain fields and out-of-plane slope fields near a crack-tip under various quasi-static loading conditions. A brittle polyester resin (Homalite-100) was used as a model material for measuring in-plane and out-of-plane displacement gradient fields near a notch tip.

Figure 7A:
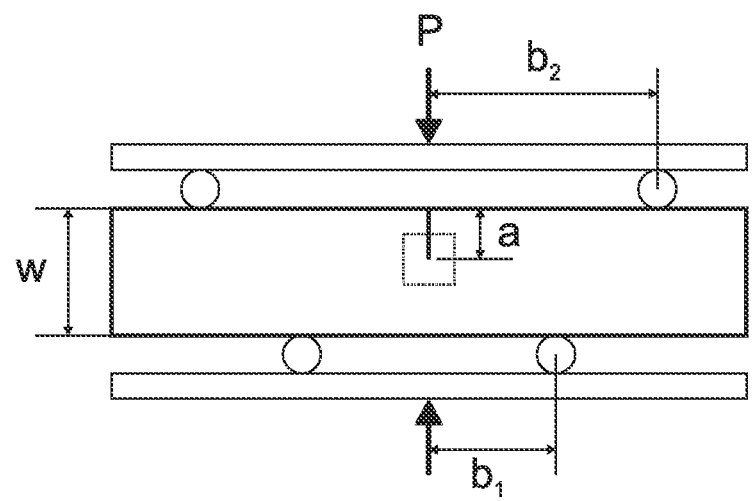
FIGS. 7A and 7B show two sample loading configurations used for testing an apparatus based on the design in FIG. 1A where the optical shearing device is implemented by using a coherent gradient sensing (CGS) device having two shearing gratings.
Figure 7B:
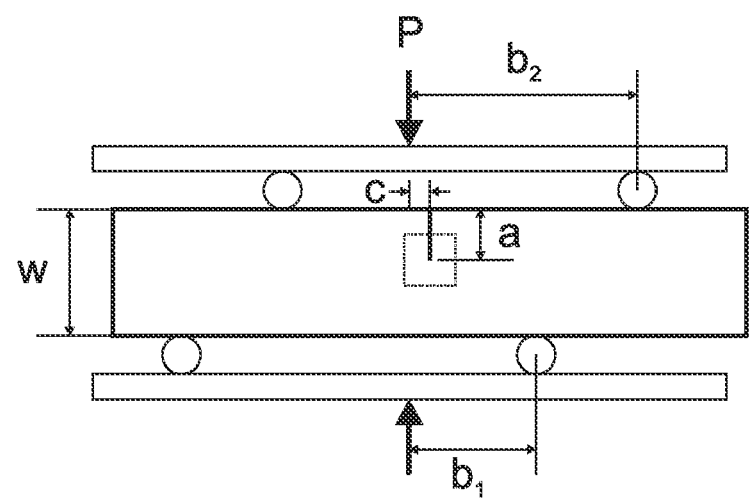

FIGS. 7A and 7B show symmetric and asymmetric four-point bending fracture loading configurations in measuring a single-end-notch specimen that is machined from a Homalite-100 sheet (thickness, h=4.66 mm) with a notch width of 250 μm. A square region (10 mm×10 mm) surrounding the notch tip was chosen as a field of view for the measurements. Symmetric and asymmetric loading configurations of the four-point bending fracture tests were conducted [18, 19]. A diffraction grating $G_0$ of 1200 lines/mm (pitch d=0.8333 μm) was bonded to the specimen surface using established grating replication techniques [3].

In conducting the tests, the specimen was illuminated by two oblique, expanded, and properly collimated laser beams of wavelength, λ=0.633 μm using the optical arrangement depicted in FIG. 2A. The two illuminating beams with wave vectors $k_1$ and $k_2$ in the $x_2$-$x_3$ plane, respectively were diffracted by the specimen grating and the optical configuration was precisely adjusted such that $1^{st}$ order diffracted beams, comprising the ($u_2$,$u_3$) beam pair, emerged coincident and normal to the specimen in accordance with (2). Precise alignment of the optical configuration was achieved through the temporary establishment of moiré null field fringe patterns using the same master grating element from which the specimen replica grating was obtained [3]. An orthogonal ($u_1$,$u_3$) beam pair was not utilized in the validation study. A CGS lateral shearing interferometer was assembled using two linear Ronchi gratings $G_1$ and $G_2$ of with a frequency of 40 lines/mm (p=25.4 μm), an imaging lens L of focal length, f=300 mm, a circular filtering aperture A (diameter, D=5 mm) at the focal plane of the lens L, and an image plane I. (FIG. 2B). The optical axis of the interferometer was made to coincide with the propagation axis defined by the normally diffracted beams. An instrument grating spacing of Δ=20 mm resulted in a lateral shearing distance of 0.5 mm which was sufficient to conduct displacement gradient mappings of the specimen surface in the targeted application. The resulting interference fringe patterns at the image plane were recorded using a digital CCD camera (Uniq Vision, Inc., UP-1030) with a resolution of 1024×1024 pixels. Implemented phase shifting diagnostics provided an automated fringe analysis capability which eliminated the need for any fringe counting or fringe tracing. A three-step phase-shifting technique was employed by translating one of the diffraction gratings with respect to the other using a PZT actuator (Physik Instrumente, P-840.10). The phase shifting device was precisely calibrated in order to eliminate phase shift errors introduced PZT non-linearity and other sources of phase shift error as described by Creath [17]. Calibration was achieved through the use of parallel tilt fringes which were created by slightly tilting one of the two instrument gratings after establishing a null fringe condition. Once the optical configuration was precisely aligned and phase diagnostics calibrated, the master grating element was removed and replaced by a test specimen within a miniature load frame assembly. The (undeformed) specimen and loading assembly were then adjusted such that the surface of the specimen was made to coincide with the same plane which was previously occupied by master grating element.

Two sets of three phase-shifted interferograms were recorded from each m=±1 diffraction order comprising the ($u_2$,$u_3$) beam pair before any load was applied in order to establish an undeformed reference configuration. Two sets of three phase-shifted interferograms were then recorded at each load level by alternating between the two illuminating beams shown in FIG. 2. Phase unwrapping from all acquired interferograms was then achieved by application of (17) Background noise due to surface imperfections within the specimen grating and the optical components were removed by subtracting corresponding phase maps acquired before and after loading. In this study, a digital image correlation procedure was also applied to the modulation maps from (18), taken before and after loading, in order to correct for any rigid-body rotation which may have occurred between load states. Phase subtraction procedures were then applied in order to de-couple the in-plane and out-of-plane displacement field gradients in accordance with (20) and (21).

In order to demonstrate the accuracy and robustness of the proposed optical technique, three fracture tests were conducted. Tests involved static notches loaded to produce mode-I, mode-II and mixed-mode asymptotic crack-tip fields which can be characterized by three different values of mode mixity (Y=0°,45°,90°) defined as $$Y = \tan^{-1}(K_{II}/K_I) \qquad (41)$$

where $K_I$ and $K_{II}$ correspond to mode-I and mode-II stress intensity factors, respectively.

Four interferograms, obtained using the diffracted wave front shearing configuration, corresponding to a symmetric mode-I near-tip loading condition (P=100N, Y=0°) are shown in FIG. 8. FIGS. 8a and 8b show the fringe patterns, corresponding to the m=1 and m=−1 diffraction orders respectively, obtained with a shearing vector s along the $x_2$-direction and two illuminating beams with wave vectors $k_1$ and $k_2$ in the $x_2$-$x_3$ plane, respectively. Thus, the fringe patterns represent constant contours of constant differential displacement as described by (10) or equivalently, displacement gradient maps that are related to the linear combinations of $$\frac{\partial u_2}{\partial x_2} \text{ and } \frac{\partial u_3}{\partial x_2}$$

as described by equation (11). The fringe patterns in FIGS. 8c and 8d were obtained after rotating the CGS instrument gratings by 90 degrees, so that the shearing vector s was aligned with $x_1$-direction. Thus, the fringe patterns in FIGS. 8c and 8d represent constant contours of constant differential displacement as described by (10) or equivalently, displacement gradient maps that are related to the linear combinations of $$\frac{\partial u_2}{\partial x_1} \text{ and } \frac{\partial u_3}{\partial x_1}$$

as described by equation (11).

Figure 9:
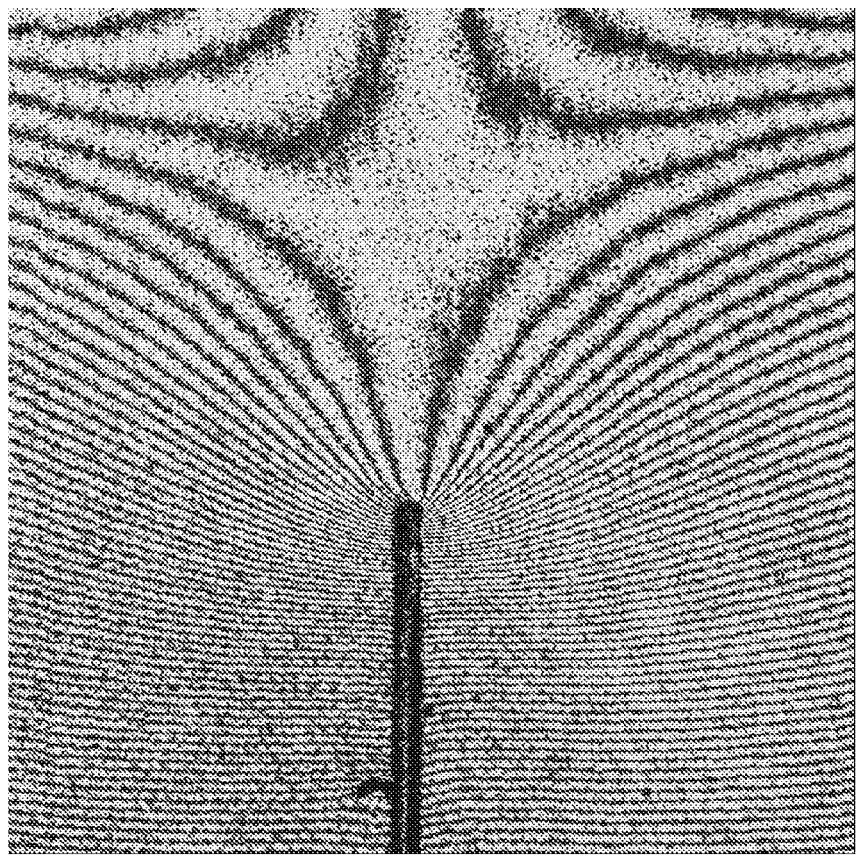

In addition to the CGS measurements, Moiré fringes were also easily obtained by simply removing one of the double gratings and allowing the $(u_2,u_3)$ beams to mutually interfere. FIG. 9 shows the Moiré fringes which represent contours of constant in-plane displacement component $u_2$ which is naturally differentiated using the proposed diffracted wave front configuration.

In order to perform quantitative phase measurements, the three-step phase-shifting algorithm was used to unwrap the relative phase maps before and after loading. The changes in the relative phase maps were obtained by subtracting the initial phase maps before loading from the "deformed" phase maps after loading.

Figure 8B:
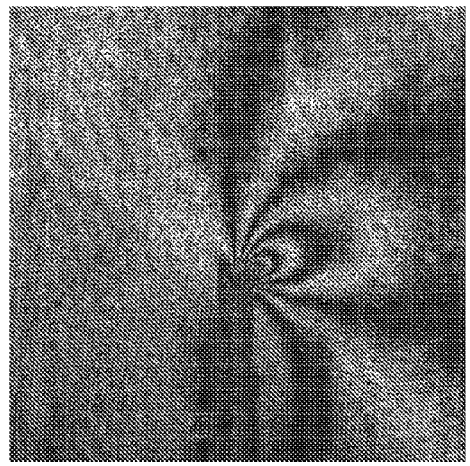
FIGS. 8A, 8B, 8C, 8D, 9, 10A, 10B, 11A, 11B, 11C and 11D shows various measurements using the sample loading configurations in FIGS. 7A and 7B in an apparatus based on the design in FIG. 1A where the optical shearing device is implemented by using a coherent gradient sensing (CGS) device having two shearing gratings.
Figure 8D:
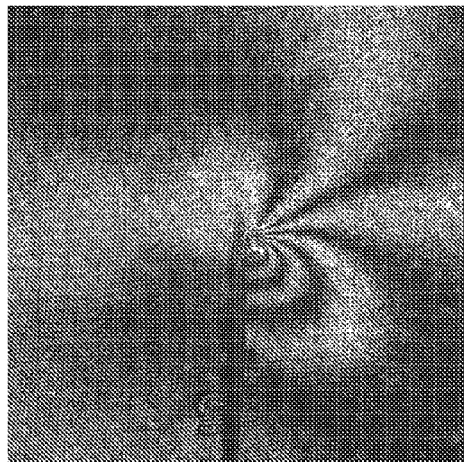
Figure 8A:
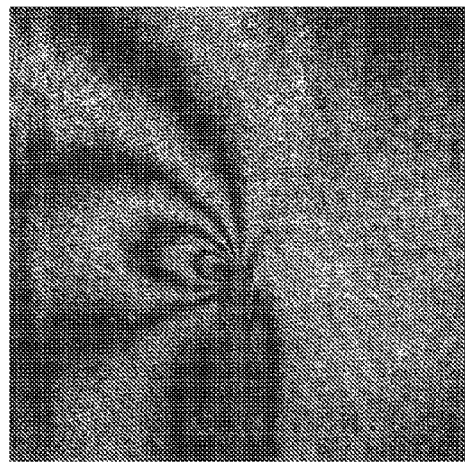
Figure 8C:
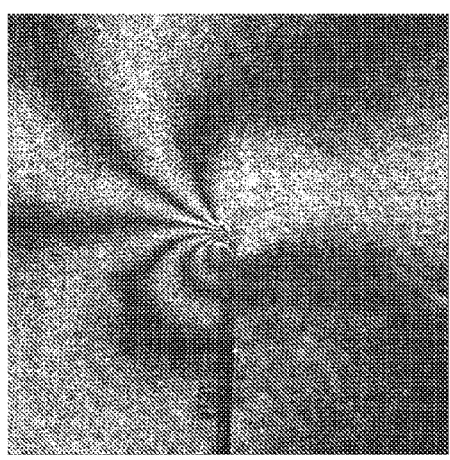
Figure 10B:
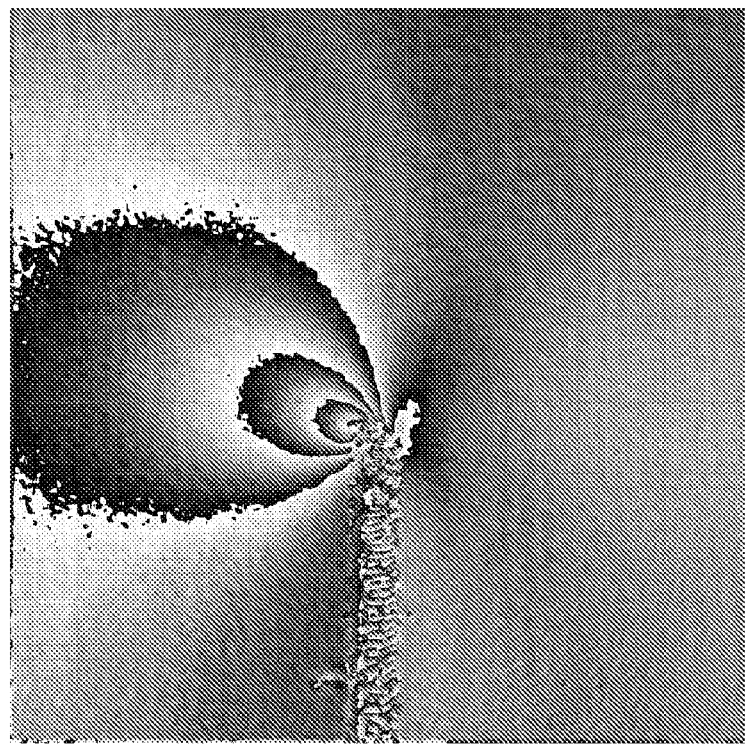
Figure 10A:
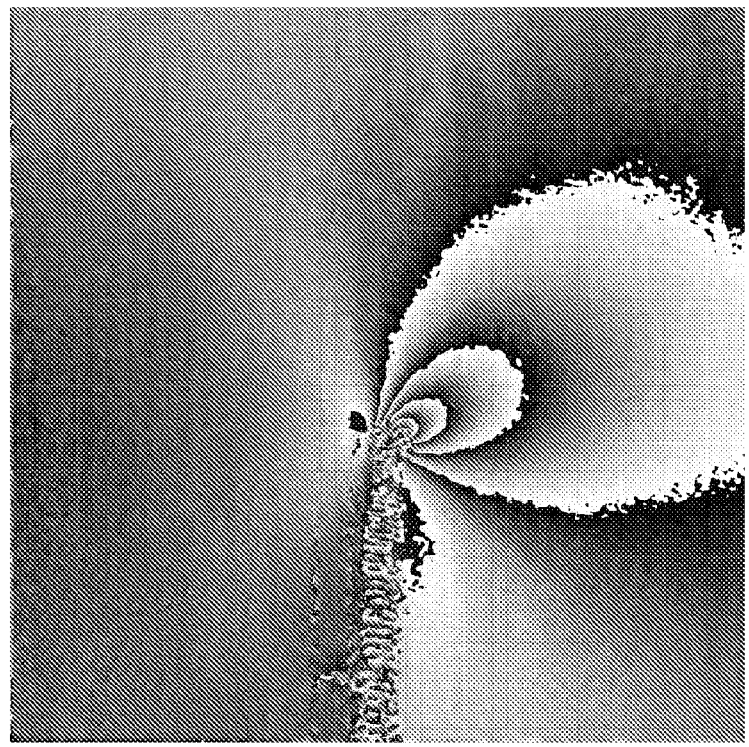
Figure 11B:
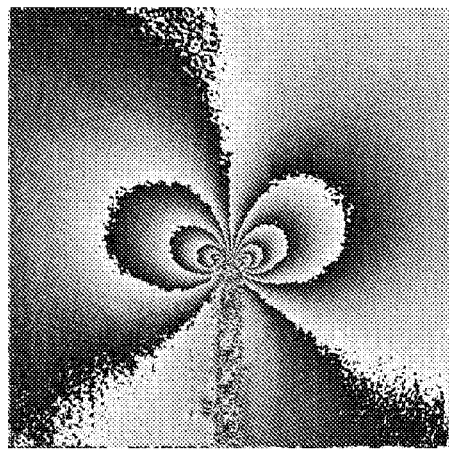
Figure 11D:
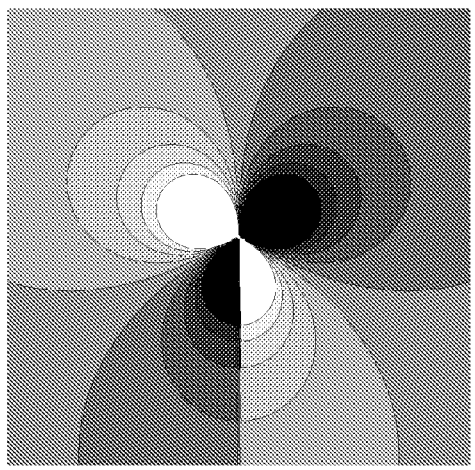
Figure 11A:
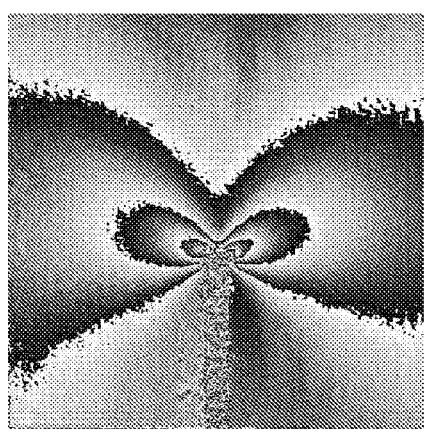
Figure 11C:
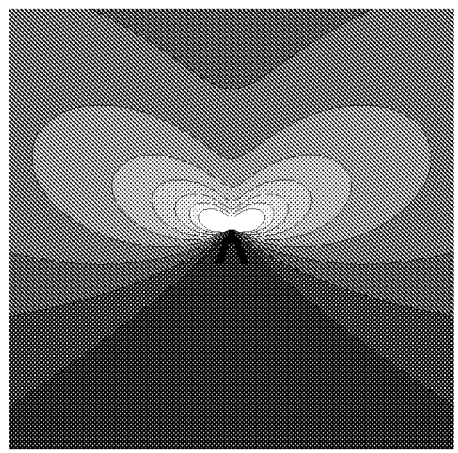

FIGS. 10A and 10B show the phase maps corresponding to the fringes in FIGS. 8A and 8B respectively, and are represented as 256-grayscale images of wrapped $2\pi$-phase maps. Following this step, the decomposition of in-plane and out-of-plane displacement gradient fields was achieved by subtracting and adding the phase maps in FIG. 10. The resulting phase maps, which correspond to the in-plane displacement gradient field $$\frac{\partial u_2}{\partial x_2}$$

and the out-of-plane displacement gradient field $$\frac{\partial u_3}{\partial x_2}$$

are displayed in FIG. 11A and FIG. 11B respectively. The phase map shown in FIG. 11A corresponds to a phase map of the $e_{22\,strain\,field}$, where each $2\pi$-phase fringe is represents a strain difference of $8.36\times10^{-4}$. The phase map shown in FIG. 11B represents a phase map of surface slope where each $2\pi$-phase fringe represents a slope difference of $3.85\times10^{-4}$. The theoretically predicted strain and the slope contours from the asymptotic analytical crack-tip $K_I$ fields in the plane-stress condition are shown in FIGS. 11C and 11D for comparison purposes. The general shape and orientation of the fringes match qualitatively well with those of the strain and the surface slope field from the asymptotic near-tip solution. Similar results were obtained for the mixed mode and mode-II cases.

In order to avoid interference between diffracted beams from different optical probe beams, the delivery of the different optical probe beams can be controlled to direct one optical probe beam to the sample surface at a time and direct different optical probe beams to the sample surface at different times so that two different optical probe beams are not present at the sample surface at the same time. Alternatively, two different probe beams may be directed to the sample at the same with orthogonal polarizations to avoid interference.

Figure 12:
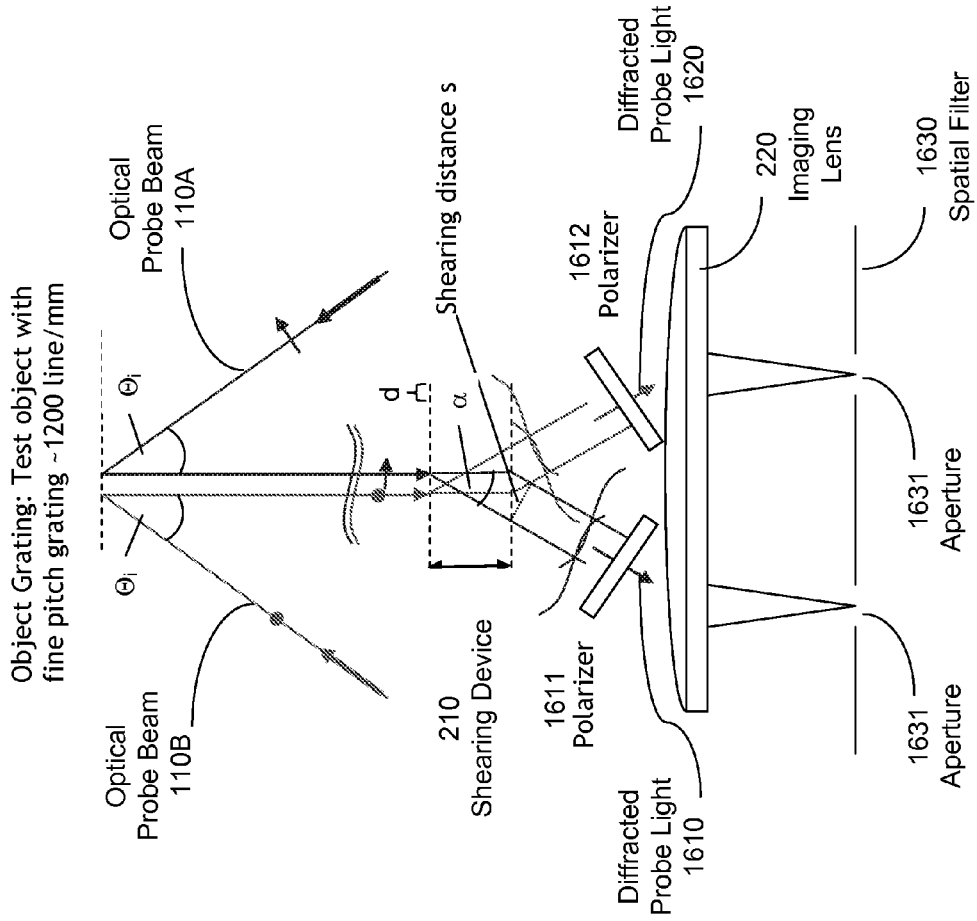
FIG. 12 shows a polarization coding design in one implementation for the apparatus in FIG. 1A.

FIG. 12 illustrates one example apparatus that implements a polarization coding to optically separate two different probe beams. As illustrated, the two symmetric optical probe beams 110A and 110B for interacting with one of two gratings on the sample surface are controlled to have orthogonal polarizations, e.g., the beam 110B in the p polarization and the beam 110A in the s polarization. A polarization rotator or controller can be used to achieve this polarization status for the two beams 110A and 110B. The diffracted beam 1610 produced by the sample grating from the probe beam 110B and the diffracted beam 1620 produced by the same sample grating from the probe beam 110A are both directed into the shearing device 210 at the same time and two polariers 1611 and 1612 are placed at the optical output of the shearing device 210 to separate the sheared optical outputs in the p and s polarizations. The polarizer 1611 is oriented to transmit light in the p polarization while blocking light in the s polarization and the polarizer 1612 is oriented to transmit light in the s polarization while blocking light in the p polarization. Under this design, the sheared optical output in the p polarization originated from the diffracted probe beam 1610 and the sheared optical output in the s polarization originated from the diffracted probe beam 1620 are two separate beams at two different directions and thus are imaged by the imaging lens 220 to two different locations 1631 and 1632, respectively, on the spatial filter 1630. The spatial filter 1630 is designed to have apertures at the locations 1631 and 1632 to transmit the images onto the imaging plane where two different imaging arrays can be used to capture the two different interferogram images.

In the above measurements, the shearing along two orthogonal directions can be achieved by either using a single CGS shearing device or two different CGS shearing devices. When a single CGS shearing device is used. the relative orientation between the sample and the CGS device can be adjusted to align the CGS device to the x1 direction for shearing along the x1 direction and then align the CGS device to the x2 direction for shearing along the x2 direction. Each of the two gratings in the CGS device may also be configured to having cross gratings to allow for simultaneous shearing along two different directions.

Figure 13:
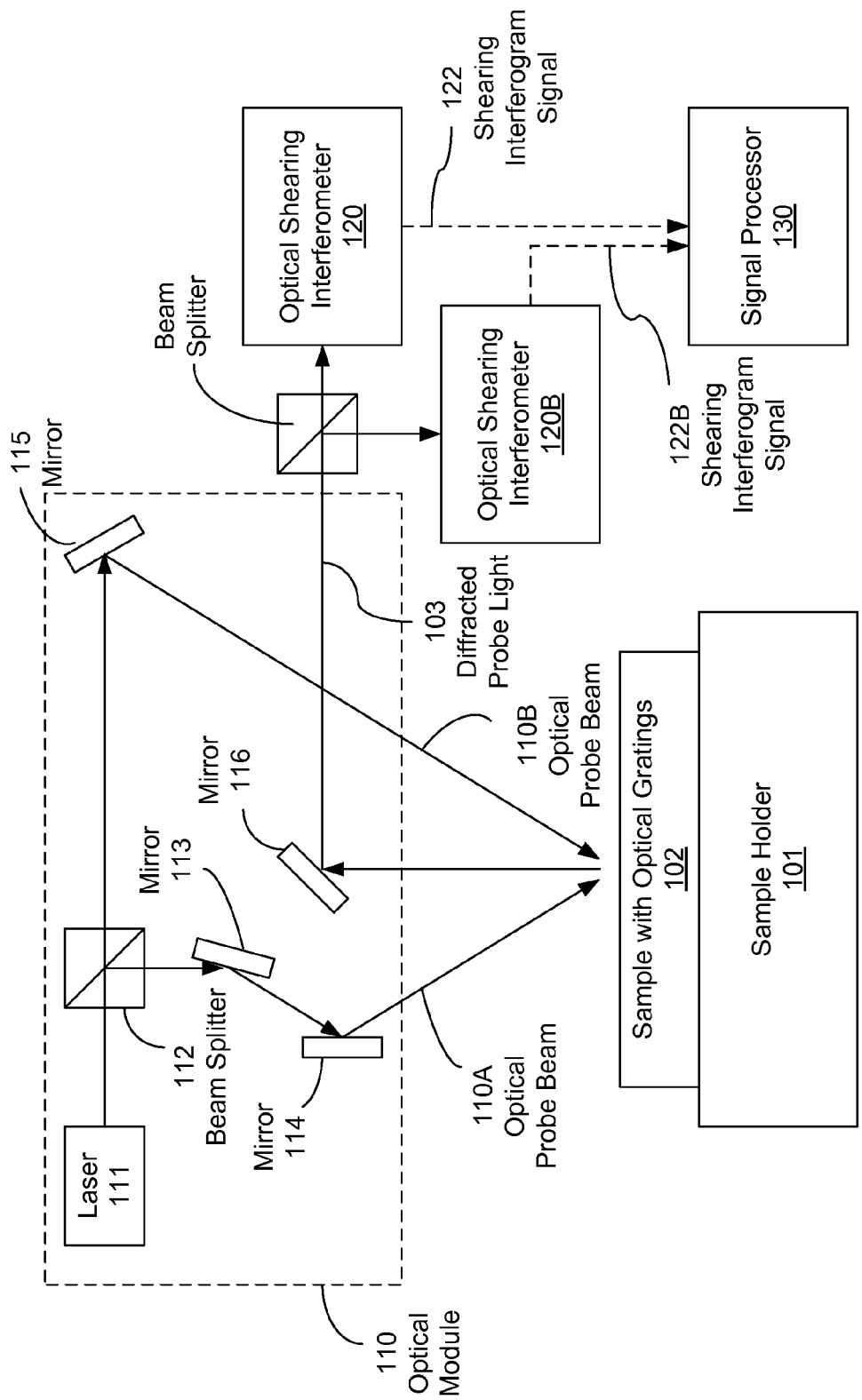
FIG. 13 shows an apparatus based on the design in FIG. 1A where two optical shearing devices are provided for shearing at two different shearing directions.

FIG. 13 shows an example where two shearing interferometers 120 and 120B are used to perform shearing in the two different directions x1 and x2. A beam splitter is used to split the diffracted probe light 103 from sample 102 into two different beams, one entering the shearing interferometer 120 and another entering the shearing interferometer 120B. As such, the shearing in both directions x1 and x2 can be performed at the same time.

In view of the above, one implementation of a shearing process can be performed as follows: (1) a specimen is fabricated with an attached fine pitch crossed-line diffraction grating and is used to generate coincident, normally diffracted $(u_1,u_3)$ and $(u_2,u_3)$ beam pairs which are directed to a lateral wave front shearing interferometer; (2) wave front shearing of each individual normally diffracted beam is conducted along the $x_1$ and $x_2$ axes; (3) a sequence of phase shifted interferograms is acquired for each individual diffracted wave front using an integrated optical phase shifting scheme; (4) a phase unwrapping algorithm is applied to each interferogram sequence through a post processing procedure in order to extract phase maps containing coupled in-plane and out-of-plane displacement field gradient data in accordance with (15); and (5) in-plane and out-of plane differential displacement field terms are subsequently de-coupled and scaled through a linear combination of symmetric phase maps as expressed by (20, 21) in order to generate whole field plots of surface slope and in-plane strain fields.

The ability of the extended method to accurately measure non-uniform strain and surface slope field was demonstrated by measuring the deformation fields near a notch tip subject to several static loading conditions. The experimental results demonstrated that the technique is capable to accurately measure deformation fields even in the presence of moderate rigid-body rotations. The new technique which bares similarities to Moiré interferometry can be trivially implemented into existing moiré interferometry set up as a complementary tool in experimental stress/strain analysis.

REFERENCES

[1] Kobayashi A S. Handbook on experimental mechanics. 2nd ed. Bethel, Conn.: Society for Experimental Mechanics; 1993.

[2] Cloud G L. Optical methods of engineering analysis. New York: Cambridge University Press; 1995.

[3] Post D, Han B, Ifju P. High sensitivity moiré: experimental analysis for mechanics and materials. New York: Springer-Verlag; 1994.

[4] B. Han and D. Post, immersion Interferometer for Microscopic Moire Interferometry," Experimental Mechanics, Vol 32, No. 1, pp. 38-41 (1992)

[5] J. W. Goodman, Introduction to Fourier Optics, Roberts & Company Publishers, Greenwood Village, Colo., (2005)

[4] Rastogi P K. Digital speckle pattern interferometry and related techniques. New York: Wiley; 2001.

[5] Bates W J. A wave front shearing interferometer. Proceedings of the Physical Society of London 1947; 59(6):940-950.

[6] Patorski K, Yokozeki S, Suzuki T. Collimation test by double grating shearing interferometer. Applied Optics 1976; 15(5): 1234-1240.

[7] Shang H M, Toh S L, Chau F S, Shim V P W, Tay C J. Locating and sizing disbonds in glassfibre-reinforced plastic plates using shearography. Journal of Engineering Materials and Technology-Transactions of the ASME 1991; 113(1): 99-103.

[8] Boone P M. Determination of slope and strain contours by double-exposure shearing interferometry. Experimental Mechanics 1975; 15(8): 295-302.

[9] Assa A, Betser A A, Politch J. Recording slope and curvature contours of flexed plates using a grating shearing interferometer. Applied Optics 1977; 16(9): 2504-2513.

[10] Tippur H V, Krishnaswamy S, Rosakis A J. A Coherent Gradient Sensor for crack tip deformation measurements—analysis and experimental results. International Journal of Fracture 1991; 48(3): 193-204.

[11] Tippur H V, Krishnaswamy S, Rosakis A J. Optical mapping of crack tip deformations using the methods of transmission and reflection Coherent Gradient Sensing—a study of crack tip K-dominance. International Journal of Fracture 1991; 52(2): 91-117.

[12] Rosakis A J, Two optical techniques sensitive to gradients of optical path difference: the method of caustics and the coherent gradient sensor (CGS). In: Epstein J S, editor. Experimental techniques in fracture, New York: VCH; 1993, p. 327-425.

[13] Rosakis A J, Singh R P, Tsuji Y, Kolawa E, Moore N R. Full field measurements of curvature using coherent gradient sensing: application to thin film characterization. Thin Solid Films 1998; 325(1-2): 42-54.

[14] Lee H, Rosakis A J, Freund L B. Full-field optical measurement of curvatures in ultra-thin-film-substrate systems in the range of geometrically nonlinear deformations. Journal of Applied Physics 2001; 89(11): 6116-6129.

[15] Park T S, Suresh S, Rosakis A J, Ryu J. Measurement of full-field curvature and geometrical instability of thin film-substrate systems through CGS interferometry. Journal of the Mechanics and Physics of Solids 2003; 51(11-12): 2191-2211.

[16] Shield T W, Kim K S. Diffraction theory of optical interference Moiré and a device for production of variable virtual reference gratings—a Moiré microscope. Experimental Mechanics 1991; 31(2): 126-134.

[17] Creath K. Phase-measurement interferometry techniques. Progress in Optics 1988; 26: 349-393.

[18] Tada H, Paris P C, Irwin G R. The stress analysis of cracks handbook. Hellertown, Pa.: Del Research Corp; 1973.

[19] He M Y, Hutchinson J W. Asymmetric four-point crack specimen. Journal of Applied Mechanics-Transactions of the ASME 2000; 67(1): 207-209.

[20] Malacara D., Optical Shop Testing. New York: Wiley; 1992.

[21] K.-S. Kim, R. J. Clifton, and P. Kumar, "A Combined Normal and Transverse Displacement Interferometer with an Application to Impact of Y-Cut Quartz," J. of Appl. Phys., Vol 48, No. 10, pp 4132-4139 (1977).

[22] H. D. Espinosa, M. Mello, and Y. xu, "A Variable Sensitivity Displacement Interferometer with Application to Wave Propagation Experiments," Journal of Applied Mechanics—Transactions of the ASME, Vol. 64, pp. 123-131, 1997.

[23] Mello, M.; Bongtae Han; Zhaoyang Wang. "Infrared Diffraction Interferometer for Coplanarity Measurement of High-Density Solder Bump Pattern" Optical Engineering, Volume 43, Issue 4, April 2004. Pages 888-894.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments have been described. Other embodiments are within the scope of the following claims.

The invention claimed is:

1. A method for optically characterizing a surface, comprising:

providing a first optical grating and a second optical grating on a sample surface of a sample, the first and second optical gratings being along a first grating direction and a second, different direction within the sample surface and spatially overlapping with each other;

directing a plurality of different optical probe beams to the sample surface at different incident directions, respectively;

using at least one optical shearing interferometer to receive diffracted light of the different optical probe beams from the first and the second optical gratings, without interaction between two of the different optical probe beams, to obtain phase-shifted optical shearing interferograms along two different shearing directions at each location that are perpendicular to a normal direction of the sample surface at the location; and processing obtained phase-shifted optical shearing interferograms from the different optical probe beams to generate a map of field gradients for both in-plane and out-of-plane displacements on the sample surface.

2. The method as in claim 1, further comprising:
controlling delivery of the different optical probe beams to direct one optical probe beam to the sample surface at a time and different optical probe beams to the sample surface at different times so that two different optical probe beams are not present at the sample surface at the same time.

3. The method as in claim 1, further comprising:
controlling polarizations of the different optical probe beams to direct at least two different optical probe beams with mutually orthogonal polarizations to the sample surface at the same time.

4. The method as in claim 1, wherein processing of the obtained phase-shifted optical shearing interferograms comprises:
applying a phase unwrapping processing to phase-shifted shearing interferograms for each optical probe beam to produce a phase map for the phase-shifted shearing interferograms for each optical probe beam; and
combining at least two different phase maps for phase-shifted shearing interferograms respectively for two optical probe beams to separate field gradients for in-plane displacements from field gradients fro out-of-plane displacements.

5. The method as in claim 1, wherein the first and second grating directions are perpendicular to each other and are respectively parallel to the two different shearing directions of the shearing interferometer.

6. The method as in claim 5, further comprising:
prior to placing the sample in position to receive the different optical probe beams, placing a master grating element at the location for placing the sample to align the different optical probe beams with respect to the master grating element, wherein the master grating element includes a surface that has first and second master gratings of which the first and second optical gratings on the sample surface are replica;
adjusting each of the different optical probe beams at a predetermined incident angle to produce a diffracted beam of a predetermined diffraction order from diffraction of each of the different optical probe beams by the first and second master gratings; and
subsequently using the sample surface to replace the master grating element to maintain the incident angles of the different optical probe beams with respect to the first and second gratings on the sample surface as the same as the incident angles of the different optical probe beams with respect to the first and second master gratings.

7. The method as in claim 1, wherein each optical probe beam is aligned relative to the first and second gratings on the sample surface to produce a respective diffracted beam that is normal to the sample surface.

8. The method as in claim 7, further comprising:
directing two first optical probe beams to the sample surface, from two opposite sides of the normal direction of the sample surface and at a common incident angle with respect to the normal direction, and in a plane defined by the first grating direction of the first optical grating and the normal direction, to respectively generate two first diffracted beams at the normal direction from interacting with the first optical grating on the sample surface;
directing two second optical probe beams to the sample surface from two opposite sides of the normal direction of the sample surface and at a common incident angle with respect to the normal direction in a plane defined by the second grating direction of the second optical grating and the normal direction to generate two second diffracted beams at the normal direction from interacting with the second optical grating on the sample surface; and
optically isolating the two first diffracted beams from interfering with each other and the two second diffracted beams from interfering with each other in shearing each diffracted beam in the at least one optical shearing interferometer.

9. The method as in claim 1, wherein the at least one optical shearing interferometer includes two optical shearing gratings spaced from each other and having parallel grating directions to sequentially diffract a received diffracted beam from the sample surface to produce a sharing between a diffracted wave front of the received diffracted beam and a replica of the diffracted wave front along a sharing direction perpendicular to the parallel grating directions.

10. The method as in claim 9, further comprising:
varying a lateral position between the two optical shearing gratings along a direction parallel to a plane of each of the two optical shearing gratings to obtain the phase-shifted shearing interferograms from each diffracted beam.

11. The method as in claim 9, further comprising:
varying a spacing between the two optical shearing gratings along a direction perpendicular to a plane of each of the two optical shearing gratings to obtain the phase-shifted shearing interferograms from each diffracted beam.

12. The method as in claim 9, further comprising:
rotating the two optical shearing gratings to achieve the two different shearing directions.

13. The method as in claim 9, further comprising:
splitting each diffracted beam from the sample surface into a first diffracted beam and a second diffracted beam;
directing the first diffracted beam into the two optical sharing gratings to produce phase-shifted shearing interferograms along one of the two different sharing directions; and
directing the second diffracted beam into another two optical sharing gratings to produce phase-shifted shearing interferograms along another of the two different sharing directions.

14. The method as in claim 1, further comprising:
using the one optical shearing interferometer to obtain phase-shifted sharing interferograms along one of the two different sharing directions;
using a second optical sharing interferometer to obtain phase-shifted sharing interferograms along another of the two different sharing directions; and
splitting diffracted light of each of the different optical probe beams from the first and the second optical gratings into a first diffracted beam into the one optical shearing interferometer and a second diffracted beam into the second optical shearing interferometer.

15. The method as in claim 1, wherein each optical probe beam and a respective diffracted beam produced by one of the first and second optical gratings on the sample surface are on a common side of the sample surface.

16. The method as in claim 1, wherein each optical probe beam and a respective diffracted beam produced by one of the first and second optical gratings on the sample surface are on opposite sides of the sample surface.

17. A system for optically characterizing a surface, comprising:
 a sample holder for holding a sample having a sample surface on which a first optical grating and a second optical grating are formed to spatially overlap with each other and along a first grating direction and a second, different direction within the sample surface;
 an optical module to produce and direct a plurality of different optical probe beams to the sample surface at different incident directions, respectively;
 an optical shearing interferometer module to receive diffracted light of the different optical probe beams from the first and the second optical gratings, without interaction between any two of the different optical probe beams, to obtain phase-shifted optical shearing interferograms along two different shearing directions at each location that are perpendicular to a normal direction of the sample surface at the location; and
 a signal processor to process obtained phase-shifted optical shearing interferograms from the different optical probe beams to generate a map of field gradients for both in-plane and out-of-plane displacements on the sample surface.

18. The system as in claim 17, wherein the optical module includes a beam control mechanism in optical paths of the different optical probe beams to control delivery of the different optical probe beams to direct one optical probe beam to the sample surface at a time and different optical probe beams to the sample surface at different times so that two different optical probe beams are not present at the sample surface at the same time.

19. The system as in claim 18, wherein the beam control mechanism comprises a plurality of optical shutters respectively placed in optical paths of the different optical probe beams to control delivery of the different optical probe beams to direct one optical probe beam to the sample surface at a time and different optical probe beams to the sample surface at different times.

20. The system as in claim 17, wherein the optical module includes a beam control mechanism in optical paths of the different optical probe beams to control optical polarizations of the different optical probe beams to direct at least two different optical probe beams with mutually orthogonal polarizations to the sample surface at the same time.

21. The system as in claim 17, wherein the signal processor is operable to apply a phase unwrapping processing to phase-shifted shearing interferograms for each optical probe beam to produce a phase map for the phase-shifted shearing interferograms for each optical probe beam and to combine at least two different phase maps for phase-shifted shearing interferograms respectively for two optical probe beams to separate field gradients for in-plane displacements from field gradients fro out-of-plane displacements.

22. The system as in claim 17, wherein the two different shearing directions of the optical shearing interferometer are parallel to the first and second grating directions of the first and second optical gratings on the sample surface.

23. The system as in claim 17, wherein the optical module aligns each optical probe beam relative to the first and second gratings on the sample surface to produce a respective diffracted beam that is normal to the sample surface.

24. The system as in claim 23, wherein the optical module directs two first optical probe beams to the sample surface from two opposite sides of the normal direction of the sample surface and at a common incident angle with respect to the normal direction in a plane defined by the first grating direction of the first optical grating and the normal direction to generate two first diffracted beams at the normal direction from interacting with the first optical grating on the sample surface, and
 the optical module directs two second optical probe beams to the sample surface, from two opposite sides of the normal direction of the sample surface and at a common incident angle with respect to the normal direction, and in a plane defined by the second grating direction of the second optical grating and the normal direction, to generate two second diffracted beams at the normal direction from interacting with the second optical grating on the sample surface; and
 wherein the optical module includes a beam control mechanism which optically isolates the two first diffracted beams from interfering with each other and the two second diffracted beams from interfering with each other in shearing each diffracted beam in the at least one optical shearing interferometer.

25. The system as in claim 17, wherein the optical shearing interferometer module comprises two optical shearing gratings spaced from each other and having parallel grating directions to sequentially diffract a received diffracted beam from the sample surface to produce a sharing between a diffracted wave front of the received diffracted beam and a replica of the diffracted wave front along a sharing direction perpendicular to the parallel grating directions.

26. The system as in claim 25, wherein the optical shearing interferometer module comprises a grating control mechanism operable to adjust a lateral position between the two optical shearing gratings along a direction parallel to a plane of each of the two optical shearing gratings to obtain the phase-shifted shearing interferograms from each diffracted beam.

27. The system as in claim 25, wherein the optical shearing interferometer module comprises a grating control mechanism operable to adjust a spacing between the two optical shearing gratings along a direction perpendicular to a plane of each of the two optical shearing gratings to obtain the phase-shifted shearing interferograms from each diffracted beam.

28. The system as in claim 25, wherein the optical shearing interferometer module comprises a grating control mechanism operable to rotate the two optical shearing gratings to achieve the two different shearing directions.

29. The system as in claim 17, wherein the optical shearing interferometer module comprises two optical shearing gratings spaced from each other and having parallel grating directions to sequentially diffract a received diffracted beam from the sample surface to produce a sharing between a diffracted wave front of the received diffracted beam and a replica of the diffracted wave front along two sharing directions.

30. The system as in claim 17, further comprising:
 a beam splitter that splits each diffracted beam from the sample surface into a first diffracted beam and a second diffracted beam;
 wherein the optical shearing interferometer module comprises (1) a first optical shearing interferometer to receive and process the first diffracted beam to produce phase-shifted shearing interferograms along one of the two different sharing directions; and (2) a second optical shearing interferometer to receive and process the second diffracted beam to produce phase-shifted shearing interferograms along another of the two different sharing directions.

31. The system as in claim 30, wherein at least one of the first and second optical shearing interferometers comprises two optical shearing gratings spaced from each other and having parallel grating directions to sequentially diffract a received diffracted beam from the sample surface to produce a sharing between a diffracted wave front of the received diffracted beam and a replica of the diffracted wave front along a sharing direction perpendicular to the parallel grating directions.

32. A system for optically characterizing a surface, comprising:
   a sample holder for holding a sample having a sample surface on which a first optical grating and a second optical grating are formed to spatially overlap with each other and along a first grating direction and a second, different direction within the sample surface;
   an optical module to produce and direct a plurality of different optical probe beams to the sample surface at different incident directions, respectively;
   a beam control mechanism to control the different optical probe beams to prevent optical interference between two different optical probe beams at the sample surface;
   an optical shearing device placed in an optical path of diffracted light of the different optical probe beams from the first and the second optical gratings on the sample surface to interact with received diffracted light of each optical probe beam and to produce a replica of the diffracted light that is spatially shifted by a shearing distance along a direction parallel to the sample surface, the optical shearing device operable to adjust a phase shift between the diffracted light and the replica;
   an optical device to spatially overlap the diffracted light and the replica output from the optical shearing device to produce phase-shifted shearing interferograms from interference of the diffracted light and the replica; and
   an optical imaging device to capture images of the phase-shifted shearing interferograms.

33. The system as in claim 32, further comprising:
   a signal processor to process obtained phase-shifted optical shearing interferograms from the optical imaging device to generate a map of field gradients for both in-plane and out-of-plane displacements on the sample surface.

34. The system as in claim 33, wherein the signal processor is operable to apply a phase unwrapping processing to phase-shifted shearing interferograms for each optical probe beam to produce a phase map for the phase-shifted shearing interferograms for each optical probe beam and to combine at least two different phase maps for phase-shifted shearing interferograms respectively for two optical probe beams to separate field gradients for in-plane displacements from field gradients fro out-of-plane displacements.

35. The system as in claim 32, wherein the beam control mechanism comprises at least one optical shutter to control delivery of the different optical probe beams to direct one optical probe beam to the sample surface at a time and different optical probe beams to the sample surface at different times.

36. The system as in claim 32, wherein the beam control mechanism controls optical polarizations of the different optical probe beams to direct at least two different optical probe beams with mutually orthogonal polarizations to the sample surface at the same time.

37. The system as in claim 32, wherein the optical shearing device comprises two optical gratings to shear the received diffracted light and a grating control that controls a relative position between the two optical gratings to produce phase shifts in the phase-shifted shearing interferograms.

* * * * *

UNITED STATES PATENT AND TRADEMARK OFFICE
CERTIFICATE OF CORRECTION

PATENT NO. : 7,538,891 B1  
APPLICATION NO. : 11/538055  
DATED : May 26, 2009  
INVENTOR(S) : Michael Mello and Ares J. Rosakis Page 1 of 1

It is certified that error appears in the above-identified patent and that said Letters Patent is hereby corrected as shown below:

In claim 4, column 29, line 32, delete "fro" and insert --for--.

In claim 21, column 31, line 57, delete "fro" and insert --for--.

In claim 34, column 34, line 16, delete "fro" and insert --for--.

Signed and Sealed this

Twenty-ninth Day of September, 2009

David J. Kappos  
*Director of the United States Patent and Trademark Office*